United States Patent
Wang et al.

(10) Patent No.: US 11,778,204 B2
(45) Date of Patent: Oct. 3, 2023

(54) HANDLING OF CODED VIDEO IN SUB-BITSTREAM EXTRACTION PROCESS

(71) Applicants: Beijing Bytedance Network Technology Co., Ltd., Beijing (CN); Bytedance Inc., Los Angeles, CA (US)

(72) Inventors: Ye-kui Wang, San Diego, CA (US); Zhipin Deng, Beijing (CN); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/992,236

(22) Filed: Nov. 22, 2022

(65) Prior Publication Data

US 2023/0099966 A1    Mar. 30, 2023

Related U.S. Application Data

(63) Continuation of application No. PCT/CN2021/095184, filed on May 21, 2021.

(51) Int. Cl.
*H04N 19/46*       (2014.01)
*H04N 19/172*      (2014.01)
(Continued)

(52) U.S. Cl.
CPC ......... *H04N 19/172* (2014.11); *H04N 19/105* (2014.11); *H04N 19/174* (2014.11);
(Continued)

(58) Field of Classification Search
CPC .... H04N 19/46; H04N 19/174; H04N 19/188; H04N 19/70
See application file for complete search history.

(56) References Cited

U.S. PATENT DOCUMENTS 9,654,802 B2    5/2017    Wang
9,872,062 B1    1/2018    Rombakh et al.
(Continued)

FOREIGN PATENT DOCUMENTS

CN    102158733 A    8/2011
CN    104604236 A    5/2015
(Continued)

OTHER PUBLICATIONS

Brass et al. (Versatile Video Coding (Draft 9), Joint Video Experts Team (JVET) of ITU-T SG 16 WP 3 and ISO/IEC JTC 1/SC 29/WG 11 18th Meeting: by teleconference, Apr. 15-24, 2020.*
(Continued)

*Primary Examiner* — Fabio S Lima
(74) *Attorney, Agent, or Firm* — Conley Rose, P.C.

(57) ABSTRACT

Embodiments for video processing, including video coding, video decoding and video transcoding are described. One example method includes performing a conversion between a video having one or more video pictures in a video layer and a bitstream of the video according to a rule, wherein the rule specifies that, in a process of sub-bitstream extraction, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the sub-bitstream extraction.

20 Claims, 18 Drawing Sheets

(51) Int. Cl.
| | |
|---|---|
| *H04N 19/184* | (2014.01) |
| *H04N 19/186* | (2014.01) |
| *H04N 19/169* | (2014.01) |
| *H04N 19/70* | (2014.01) |
| *H04N 19/96* | (2014.01) |
| *H04N 19/174* | (2014.01) |
| *H04N 19/105* | (2014.01) |

(52) U.S. Cl.
CPC ......... *H04N 19/184* (2014.11); *H04N 19/186* (2014.11); *H04N 19/188* (2014.11); *H04N 19/46* (2014.11); *H04N 19/70* (2014.11); *H04N 19/96* (2014.11)

(56) References Cited

U.S. PATENT DOCUMENTS

| | | | |
|---|---|---|---|
| 2005/0162566 | A1 | 7/2005 | Chuang et al. |
| 2010/0098154 | A1 | 4/2010 | Lou et al. |
| 2014/0086311 | A1 | 3/2014 | Lou et al. |
| 2015/0373348 | A1 | 12/2015 | Wang et al. |
| 2017/0006300 | A1 | 1/2017 | Tsukuba |
| 2017/0019673 | A1 | 1/2017 | Tsukuba |
| 2017/0085894 | A1 | 3/2017 | Ramasubramonian et al. |
| 2017/0332098 | A1 | 11/2017 | Rusanovskyy et al. |
| 2018/0146225 | A1 | 5/2018 | Hannuksela |
| 2019/0052910 | A1 | 2/2019 | Deshpande et al. |
| 2019/0082184 | A1 | 3/2019 | Hannuksela |
| 2019/0089976 | A1 | 3/2019 | Huang et al. |
| 2020/0107027 | A1 | 4/2020 | He et al. |
| 2020/0145705 | A1 | 5/2020 | Hannuksela et al. |
| 2021/0014512 | A1 | 1/2021 | Stegemann |
| 2021/0203965 | A1 | 7/2021 | Choi |
| 2021/0352307 | A1 | 11/2021 | Bae |
| 2021/0368189 | A1 | 11/2021 | Choi |
| 2021/0392332 | A1 | 12/2021 | Choi |
| 2022/0141488 | A1* | 5/2022 | He ................ H04N 19/172 375/240.12 |
| 2022/0166997 | A1 | 5/2022 | Denoual |
| 2022/0201308 | A1 | 6/2022 | Hendry |
| 2022/0210428 | A1 | 6/2022 | Choi |
| 2022/0217410 | A1 | 7/2022 | Wang |
| 2022/0286667 | A1 | 9/2022 | Lu |
| 2022/0377384 | A1* | 11/2022 | Wang ................ H04N 19/184 |
| 2022/0385935 | A1 | 12/2022 | Lu |
| 2022/0400270 | A1 | 12/2022 | Meardi |
| 2022/0408115 | A1 | 12/2022 | Hendry |
| 2023/0037902 | A1* | 2/2023 | Sánchez De La Fuente ................ H04N 19/15 |

FOREIGN PATENT DOCUMENTS

| | | | |
|---|---|---|---|
| CN | 104641648 | A | 5/2015 |
| CN | 104662914 | A | 5/2015 |
| CN | 104798377 | A | 7/2015 |
| CN | 104919802 | A | 9/2015 |
| CN | 106170982 | A | 11/2016 |
| CN | 105723718 | A | 12/2018 |
| CN | 108965882 | A | 12/2018 |
| CN | 109547815 | A | 3/2019 |
| CN | 110035331 | A | 7/2019 |
| WO | 2020016562 | A1 | 1/2020 |

OTHER PUBLICATIONS

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

"Information technology—High efficiency coding and medxia delivery in heterogeneous environments—Part 2: High Efficiency Video Coding," ISO/IEC JTC 1/SC 29/WG 11 N17661, Rec. ITU-T H.265 | ISO/IEC 23008-2:201x (4th Ed.), Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

VTM software, Retrieved from the internet: https://vcgit.hhi.fraunhofer.de/jvet/VVCSoftware_VTM.git, Feb. 7, 2023, 3 pages.

"Information technology—Coding of audio-visual objects—Part 12: ISO base media file format, Technical Corrigendum 1," ISO/IEC 14496-12:2015/Cor.1, Jun. 3, 2016, 303 pages.

Qualcomm Incorporated, "Editor's Version of DASH Is 4th Edition," ISO/IEC JTC1/SC29/WG11 MPEG2019/m52458, Jan. 2020, 287 pages.

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Foreign Communication From a Related Counterpart Application, International Application No. PCT/CN2021/095179, International Search Report dated Jul. 7, 2021, 11 pages.

Foreign Communication From a Related Counterpart Application, International Application No. PCT/CN2021/095182, International Search Report dated Jul. 26, 2021, 11 pages.

Foreign Communication From a Related Counterpart Application, International Application No. PCT/CN2021/095184, International Search Report dated Jul. Aug. 18, 2021, 16 pages.

Foreign Communication From a Related Counterpart Application, International Application No. PCT/CN2021/095199, International Search Report dated Aug. 11, 2021, 10 pages.

Non-Final Office Action dated Mar. 16, 2023, 16 pages, U.S. Appl. No. 17/992,192, filed Nov. 22, 2022.

Non-Final Office Action dated Apr. 6, 2023, 14 pages, U.S. Appl. No. 17/992,246, filed Nov. 22, 2022.

Foreign Communication From A Related Counterpart Application, Indian Application No. 202227067070, Indian Office Action dated Feb. 9, 2023, 6 pages.

Document: JVET-Q0333, Chang, Y., et al., "AhG12: On the subpicture-based scaling process," Joint Video Experts Team (JVET) of ITU-T SG 16 WP 3 and ISO/IEC JTC 1/SC29/WG 11 17th Meeting: Brussels, BE, Jan. 7-17, 2020, 9 pages.

Document: JVET-Q0334, Chang, Y., et al., "AhG8/AhG12: On the references picture resampling for the subpictures," Joint Video Experts Team (JVET) of ITU-T SG 16 WP 3 and ISO/IEC JTC 1/SC29/WG 11 17th Meeting: Brussels, BE, Jan. 7-17, 2020, 10 pages.

Document: JVET-S0154-v1, Wang, Y., et al., "AHG9/AHG8/AHG12: On the subpicture sub-bitstream extraction process," Joint Video Experts Team (JVET) of ITU-T SG 16 WP 3 and ISO/IEC JTC 1/SC29/WG 11 19th Meeting: by teleconference, Jun. 22-Jul. 1, 2020, 7 pages.

Document: JVET-R0295-v1, Skupin, R., et al., "AHG12: On subpicture conformance," Joint Video Experts Team (JVET) of ITU-T SG 16 WP 3 and ISO/IEC JTC 1/SC29/WG 11 18th Meeting: by teleconference, Apr. 15-24, 2020, 6 pages.

Document: JVET-R0264, He, Y., et al., "AHG9: On sub-bitstream extraction," Joint Video Experts Team (JVET) of ITU-T SG 16 WP 3 and ISO/IEC JTC 1/SC29/WG 11 18th Meeting: by teleconference, Apr. 15-24, 2020, 2 pages.

Document: JVET-S0154-v3, Wang, Y., et al., "AHG9/AHG8/AHG12: On the subpicture sub-bitstream extraction process," Joint Video Experts Team (JVET) of ITU-T SG 16 WP 3 and ISO/IEC JTC 1/SC29/WG 11 19th Meeting: by teleconference, Jun. 22-Jul. 1, 2020, 7 pages.

(56) References Cited

OTHER PUBLICATIONS

Foreign Communication From A related Counterpart Application, European Application No. 21809297.1, Extended European Search Report dated May 19, 2023, 11 pages.
Foreign Communication From A related Counterpart Application, European Application No. 21807616.4, Extended European Search Report dated May 19, 2023, 11 pages.

* cited by examiner

1410

1412 — Performing a conversion between a video and a bitstream of the video according to a rule, wherein the bitstream includes a first layer including pictures comprising multiple subpictures and a second layer including pictures each comprising a single subpicture, and wherein the rule specifies a combination of subpictures of the first layer and the second layer that results, upon extraction, in an output bitstream that conforms to a pre-defined format.

FIG. 14B

1420

1422 — Performing a conversion between a video and a bitstream of the video, and wherein a rule specifies whether or how an output layer set having one or more layers that include multiple subpictures and/or one or more layers having a single subpicture is indicated by a list of subpicture identifiers in a scalable nesting supplemental enhancement information (SEI) message.

1512 — Performing a conversion between a video comprising one or more layers comprising one or more video pictures comprising one or more subpictures and a bitstream of the video according to a rule, and wherein the rule specifies to disallow use of a reference picture as a collocated picture of a current picture that is split into subpictures using a subpicture layout in case that the reference picture is split according to a different subpicture layout from the subpicture layout.

FIG. 15B

Performing a conversion between a video comprising one or more layers comprising one or more video pictures comprising one or more subpictures and a bitstream of the video according to a rule, and
wherein the rule specifies that a coding tool is disabled during the conversion of a current picture that is split into subpictures using a subpicture layout in case that the coding tool relies on a different subpicture layout from the subpicture layout for a reference picture of the current picture.

FIG. 15C

HANDLING OF CODED VIDEO IN SUB-BITSTREAM EXTRACTION PROCESS

CROSS-REFERENCE TO RELATED APPLICATIONS

This application is a continuation of International Application No. PCT/CN2021/095184, filed on May 21, 2021, which claims the priority to and benefits of International Patent Application No. PCT/CN2020/091696, filed on May 22, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing coded representation of video using control information useful for decoding of the coded representation.

In one example aspect, a video processing method is disclosed. The method includes performing a conversion between a video comprising one or more video pictures comprising one or more subpictures and a bitstream of the video, wherein the conversion conforms to a rule that specifies that one or more parameters for a scaling window applicable to a subpicture are determined from one or more syntax elements during a subpicture sub-bitstream extraction process.

In another example aspect, another video processing method is disclosed. The method includes performing a conversion between a video comprising one or more layers comprising one or more video pictures comprising one or more subpictures and a bitstream of the video according to a rule, wherein the rule defines network abstraction layer (NAL) units to be extracted from a bitstream during a sub-bitstream extraction process to output a sub-bitstream, and wherein the rule further specifies one or more inputs to the sub-bitstream extraction process and/or which combination of subpictures of different layers of the bitstream are used such that an output of the sub-bitstream extraction process conforms to a pre-defined format.

In another example aspect, another video processing method is disclosed. The method includes performing a conversion between a video and a bitstream of the video according to a rule, wherein the bitstream includes a first layer including pictures comprising multiple subpictures and a second layer including pictures each comprising a single subpicture, and wherein the rule specifies a combination of subpictures of the first layer and the second layer that results, upon extraction, in an output bitstream that conforms to a pre-defined format.

In another example aspect, another video processing method is disclosed. The method includes performing a conversion between a video and a bitstream of the video, and wherein a rule specifies whether or how an output layer set having one or more layers that include multiple subpictures and/or one or more layers having a single subpicture is indicated by a list of subpicture identifiers in a scalable nesting supplemental enhancement information (SEI) message.

In another example aspect, another video processing method is disclosed. The method includes performing a conversion between a video comprising one or more video pictures in a video layer and a bitstream of the video according to a rule, and wherein the rule specifies that, in a process of sub-bitstream extraction, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the sub-bitstream extraction.

In another example aspect, another video processing method is disclosed. The method includes performing a conversion between a video comprising one or more layers comprising one or more video pictures comprising one or more subpictures and a bitstream of the video according to a rule, and wherein the rule specifies to disallow use of a reference picture as a collocated picture of a current picture that is split into subpictures using a subpicture layout in case that the reference picture is split according to a different subpicture layout from the subpicture layout.

In another example aspect, another video processing method is disclosed. The method includes performing a conversion between a video comprising one or more layers comprising one or more video pictures comprising one or more subpictures and a bitstream of the video according to a rule, and wherein the rule specifies that a coding tool is disabled during the conversion of a current picture that is split into subpictures using a subpicture layout in case that the coding tool relies on a different subpicture layout from the subpicture layout for a reference picture of the current picture.

In another example aspect, another video processing method is disclosed. The method includes performing a conversion between a video comprising one or more video pictures in a video layer and a bitstream of the video according to a rule, wherein the rule specifies that a supplemental enhancement information (SEI) network abstraction layer (NAL) unit containing an SEI message with a particular payload type does not contain another SEI message with a payload type different from the particular payload type.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

BRIEF DESCRIPTION OF DRAWINGS

FIGS. 14A to 14C show flowcharts for example methods of video processing based on some embodiments of the present disclosure.

FIGS. 15A to 15C show flowcharts for an example methods of video processing based on some embodiments of the present disclosure.

DETAILED DESCRIPTION

Figure 2:
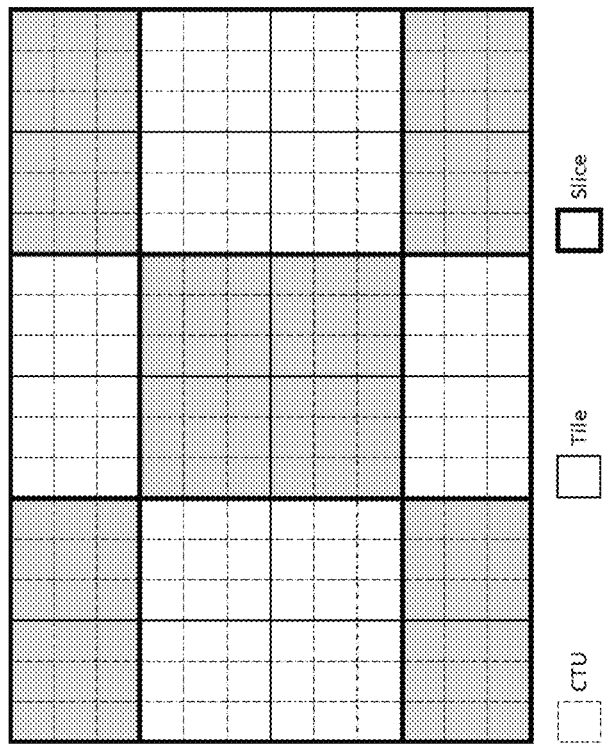
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. INTRODUCTION

This disclosure is related to video coding technologies. Specifically, it is about the subpicture sub-bitstream extraction process, the scalable nesting SEI message, and the subpicture level information SEI message. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Points
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RBSP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting.

The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and wavefront parallel processing (WPP), which may be applied for maximum transfer unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice-based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiplied by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
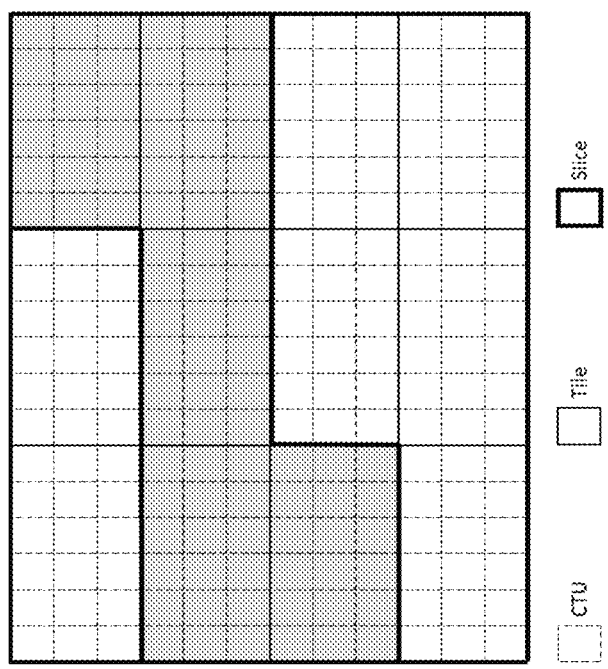
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
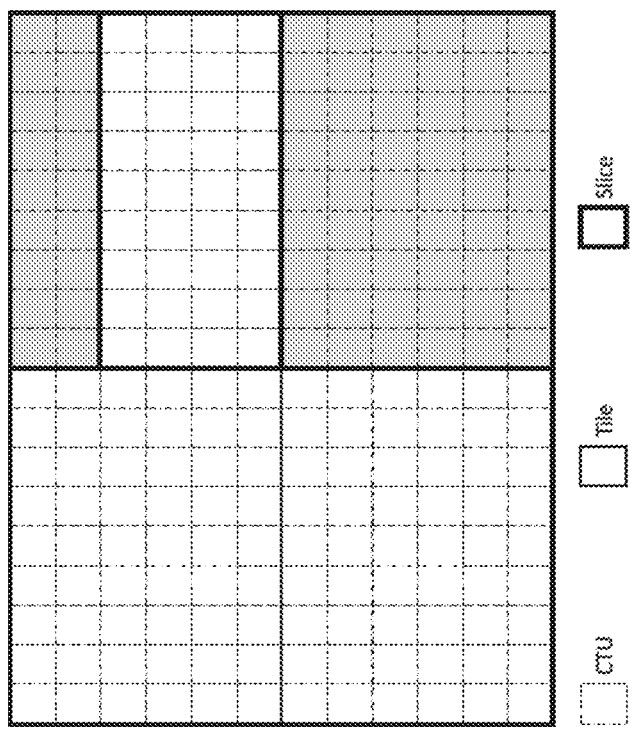
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
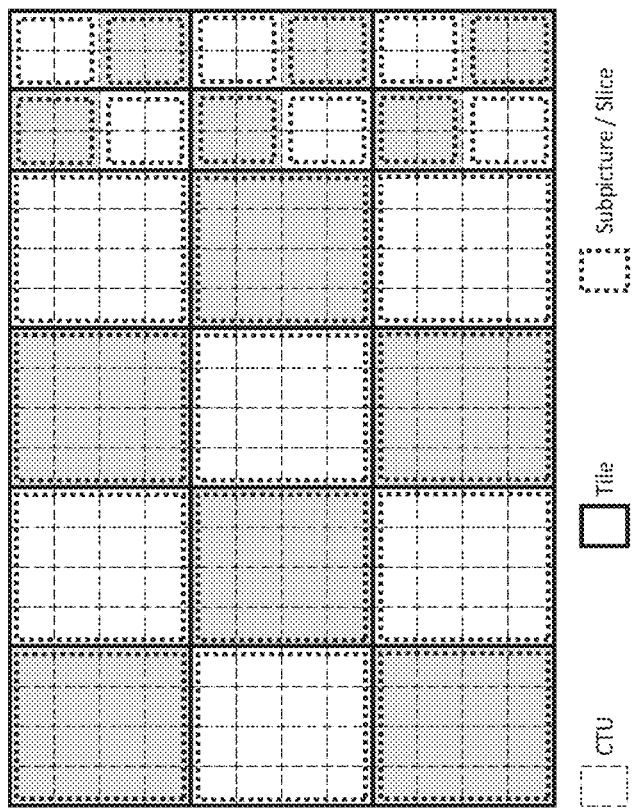
FIG. 4 shows a picture that is partitioned into 15 tiles, 24 slices and 24 subpictures.

FIG. 4 shows an example of subpicture partitioning of a picture, where a picture is partitioned into 18 tiles: 12 on the left-hand side, each covering one slice of 4-by-4 CTUs; and 6 tiles on the right-hand side, each covering 2 vertically-stacked slices of 2-by-2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an intra random access points (IRAP) picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) the picture resolution and the corresponding conformance window is signalled in the PPS instead of in the SPS, while in the SPS the maximum picture resolution is signalled; and ii) for a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an IRAP AU is required to contain a picture for each of the layers present in the CVS.

3.5. Viewport-Dependent 360° Video Streaming Based on Subpictures

In streaming of 360° video (also referred to as omnidirectional video), at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the use right now. Splitting the high-quality representation of the entire omnidirectional video into subpictures at an appropriate granularity enables such an optimization. Using VVC, the two representations can be encoded as two layers that are independent from each other.

Figure 5:
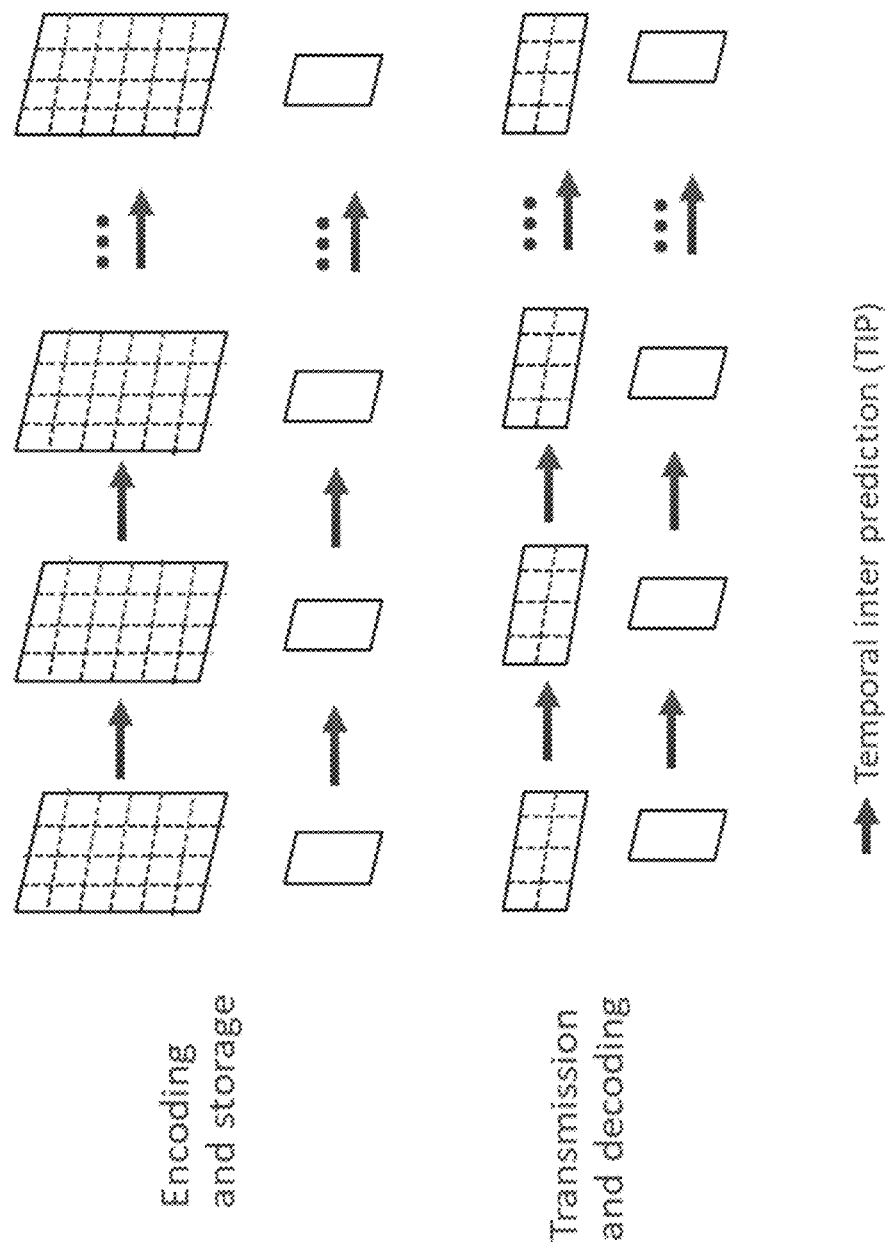
FIG. 5 shows a typical subpicture-based viewport-dependent 360° video coding scheme.

A typical subpicture-based viewport-dependent 360° video delivery scheme is shown in FIG. 5, wherein a higher-resolution representation of the full video consists of subpictures, while a lower-resolution representation of the full video does not use subpictures and can be coded with less frequent random access points than the higher-resolution representation. The client receives the full video in the lower-resolution and for the higher-resolution video, the client only receives and decode the subpictures that cover the current viewport.

Figure 6:
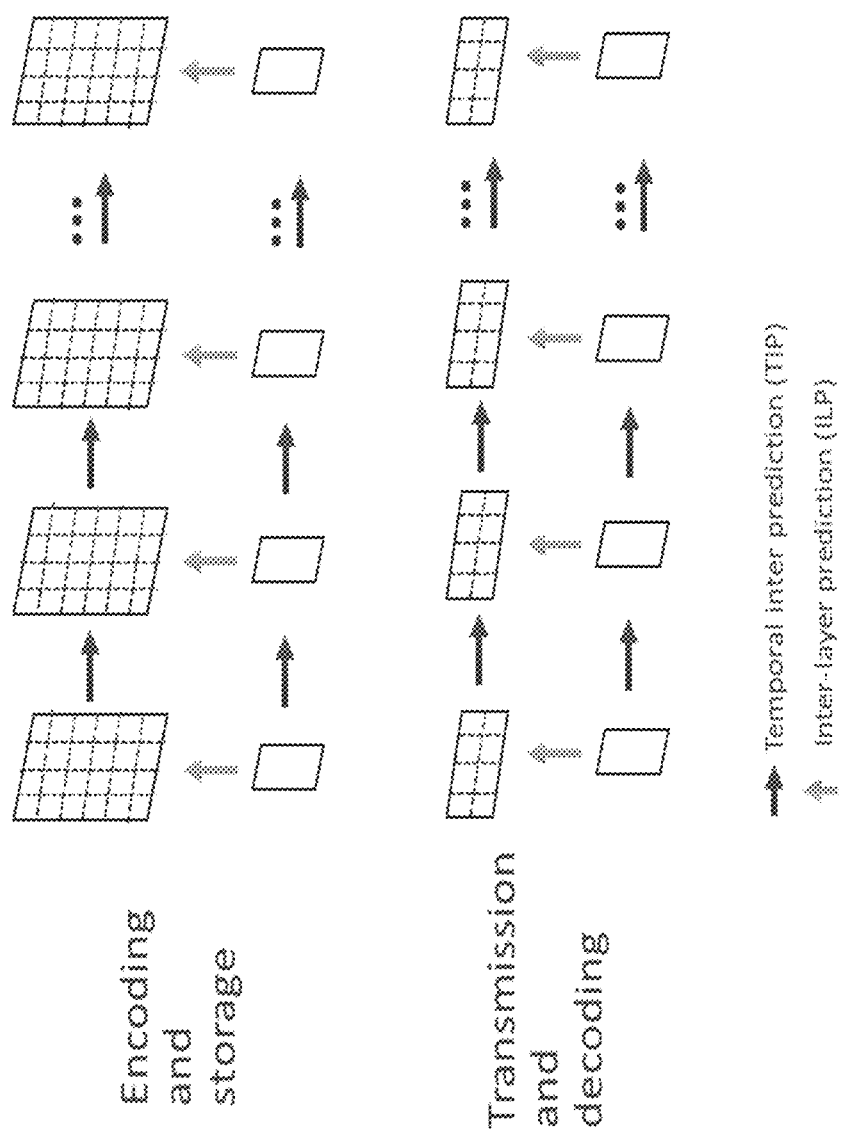
FIG. 6 shows an improved viewport-dependent 360° video coding scheme based on subpictures and spatial scalability.

The latest VVC draft specification also supports the improved 360° video coding scheme as shown in FIG. 6. The only difference compared to the approach shown in FIG. 5 is that inter-layer prediction (ILP) is applied for the approach shown in FIG. 6.

3.6. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.7. Subpicture Sub-Bitstream Extraction Process

Clause C.7 of the latest VVC text specifies a subpicture sub-bitstream extraction process, as follows:

C.7 Subpicture Sub-Bitstream Extraction Process

Inputs to this process are a bitstream inBitstream, a target OLS index targetOlsIdx, a target highest TemporalId value tIdTarget, and an array of target subpicture index values for each layer subpicIdxTarget[ ].

Output of this process is a sub-bitstream outBitstream.

It is a requirement of bitstream conformance for the input bitstream that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS, and subpicIdxTarget[ ] equal to a subpicture index present in the OLS, as inputs.

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls[targetOlsIdx][i] and with sh_subpic_id equal to the value in SubpicIdVal[subpicIdxTarget[i]] for each i in the range of 0 to NumLayersInOls[targetOlsIdx]−1, inclusive.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:

The variable subpicIdx is set equal to the value of subpicIdxTarget[[NumLayersInOls[targetOlsIdx]−1]].

Rewrite the value of general_level_idc in the vps_ols_ptl_idx[targetOlsIdx]-th entry in the list of profile_tier_level( ) syntax structures in all the referenced VPS NAL units to be equal to SubpicSetLevelIdc derived in Equation D.11 for the set of subpictures consisting of the subpictures with subpicture index equal to subpicIdx.

When VCL HRD parameters or NAL HRD parameters are present, rewrite the respective values of cpb_size_value_minus1[tIdTarget][j] and bit_rate_value_minus1[tIdTarget][j] of the j-th CPB in the vps_ols_hrd_idx[MultiLayerOlsIdx[targetOlsIdx]]-th ols_hrd_parameters( ) syntax structure in all the referenced VPS NAL units and in the ols_hrd_parameters( ) syntax structures in all SPS NAL units referred to by the i-th layer, such that they correspond to SubpicCpbSizeVcl[SubpicSetLevelIdx][subpicIdx], and SubpicCpbSizeNal[SubpicSetLevelIdx][subpicIdx] as derived by Equations D.6 and D.7, respectively, SubpicBitrateVcl[SubpicSetLevelIdx][subpicIdx] and SubpicBitrateNal[SubpicSetLevelIdx][subpicIdx] as derived by Equations D.8 and D.9, respectively, where SubpicSetLevelIdx is derived by Equation D.11 for the subpicture with subpicture index equal to subpicIdx, j is in the range of 0 to hrd_cpb_cnt_minus1, inclusive, and i is in the range of 0 to NumLayersInOls[targetOlsIdx]−1, inclusive.

For the i-th layer with i in the range of 0 to NumLayersInOls[targetOlsIdx]−1, the following applies.

Rewrite the value of general_level_idc in the profile_tier_level( ) syntax structure in all the referenced SPS NAL units with sps_ptl_dpb_hrd_params_present_flag equal to 1 to be equal to SubpicSetLevelIdc derived by Equation D.11 for the set of subpictures consisting of the subpicture with subpicture index equal to subpicIdx.

The variables subpicWidthInLumaSamples and subpicHeightInLumaSamples are derived as follows:

$$\text{subpicWidthInLumaSamples} = \min((\text{sps\_subpic\_ctu\_top\_left\_}x[\text{subpicIdx}] + \text{sps\_subpic\_width\_minus1}[\text{subpicIdx}] + 1) * \text{CtbSize}Y, \text{pps\_pic\_width\_in\_luma\_samples}) - \text{sps\_subpic\_ctu\_top\_left\_}x[\text{subpicIdx}] * \text{CtbSize}Y \quad (C.24)$$

$$\text{subpicHeightInLumaSamples} = \min((\text{sps\_subpic\_ctu\_top\_left\_}y[\text{subpicIdx}] + \text{sps\_subpic\_height\_minus1}[\text{subpicIdx}] + 1) * \text{CtbSize}Y, \text{pps\_pic\_height\_in\_luma\_samples}) - \text{sps\_subpic\_ctu\_top\_left\_}y[\text{subpicIdx}] * \text{CtbSize}Y \quad (C.25)$$

Rewrite the values of the sps_pic_width_max_in_luma_samples and spspic_height_max_in_luma_samples in all the referenced SPS NAL units and the values of pps_pic_width_in_luma_samples and pps_pic_height_in_luma_samples in all the referenced PPS NAL units to be equal to subpicWidthInLumaSamples and subpicHeightInLumaSamples, respectively.

Rewrite the value of sps_num_subpics_minus1 in all the referenced SPS NAL units and pps_num_subpics_minus1 in all the referenced PPS NAL units to 0.

Rewrite the syntax elements sps_subpic_ctu_top_left_x[subpicIdx] and sps_subpic_ctu_top_left_y[subpicIdx], when present, in all the referenced SPS NAL units to 0.

Remove the syntax elements sps_subpic_ctu_top_left_x[j], sps_subpic_ctu_top_left_y[j], sps_subpic_width_minus1[j], sps_subpic_height_minus1[j], sps_subpic_treated_as_pic_flag[j], sps_loop_filter_across_subpic_enabled_flag[j], and sps_subpic_id[j] in all the referenced SPS NAL units and for each j that is not equal to subpicIdx.

Rewrite the syntax elements in all the referenced PPS for signalling of tiles and slices to remove all tile rows, tile columns, and slices that are not associated with the subpicture with subpicture index equal to subpicIdx.

The variables subpicConfWinLeftOffset, subpicConfWinRightOffset, subpicConfWinTopOffset and subpicConfWinBottomOffset are derived as follows:

$$\text{subpicConfWinLeftOffset} = \text{sps\_subpic\_ctu\_top\_left\_}x[\text{subpicIdx}] == 0 ? \text{sps\_conf\_win\_left\_offset}:0 \quad (C.26)$$

$$\text{subpicConfWinRightOffset} = (\text{sps\_subpic\_ctu\_top\_left\_}x[\text{subpicIdx}] + \text{sps\_subpic\_width\_minus1}[\text{subpicIdx}] + 1) * \text{CtbSize}Y >= \text{sps\_pic\_width\_max\_in\_luma\_samples} ? \text{sps\_conf\_win\_right\_offset}:0 \quad (C.27)$$

$$\text{subpicConfWinTopOffset} = \text{sps\_subpic\_ctu\_top\_left\_}y[\text{subpicIdx}] == 0 ? \text{sps\_conf\_win\_top\_offset}:0 \quad (C.28)$$

$$\text{subpicConfWinBottomOffset} = (\text{sps\_subpic\_ctu\_top\_left\_}y[\text{subpicIdx}] + \text{sps\_subpic\_height\_minus1}[\text{subpicIdx}] + 1) * \text{CtbSize}Y >= \text{sps\_pic\_height\_max\_in\_luma\_samples} ? \text{sps\_conf\_win\_bottom\_offset}:0 \quad (C.29)$$

Rewrite the values of sps_conf_win_left_offset, sps_conf_win_right_offset, sps_conf_win_top_offset, and sps_conf_win_bottom_offset in all the referenced SPS NAL units and the values of pps_conf_win_left_offset, pps_conf_win_right_offset, pps_conf_win_top_offset, and pps_conf_win_bottom_offset in all the referenced PPS NAL units to be equal to subpicConfWinLeftOffset, subpicConfWinRightOffset, subpicConfWinTopOffset, and subpicConfWinBottomOffset, respectively.

Remove from outBitstream all VCL NAL units with nuh_layer_id equal to the nuh_layer_id of the i-th layer and with sh_subpic_id not equal to SubpicIdVal[subpicIdx].

When sli_cbr_constraint_flag is equal to 1, remove all NAL units with nal_unit_type equal to FD_NUT and filler payload SEI messages that are not associated with the VCL NAL units of a subpicture in subpicIdTarget[ ] and set cbr_flag[tIdTarget][j] equal to 1 of the j-th CPB in the vps_ols_hrd_idx[MultiLayerOlsIdx[targetOlsIdx]]-th ols_hrd_parameters( ) syntax structure in all the referenced VPS NAL units and SPS NAL units and j in the range of 0 to hrd_cpb_cnt_minus1. Otherwise, (sli_cbr_constraint_flag is equal to 0), remove all NAL units with nal_unit_type equal to FD_NUT and filler payload SEI messages and set cbr_flag[tIdTarget][j] equal to 0.

When outBitstream contains SEI NAL units that contain a scalable nesting SEI message with sn_ols_flag equal to 1 and sn_subpic_flag equal to 1 that are applicable to outBitstream, extract appropriate non-scalable-nested SEI message with payloadType equal to 1 (PT), 130 (DUI), or 132 (decoded picture hash) from the scalable nesting SEI message and place the extracted SEI messages into outBitstream.

4. TECHNICAL PROBLEMS SOLVED BY DISCLOSED TECHNICAL SOLUTIONS

The existing design of the subpicture sub-bitstream extraction process in the latest VVC text (in WET-R2001-vA/v10) has the following problems:

1) When extracting a rectangular region from a sequence of pictures, where the region covers one or more subpictures, to keep the scaling window to be the same as the scaling window that was used during encoding of the original bitstream, the scaling window offset parameters in the PPSs would need to be rewritten, because the picture width and/or height of the extracted pictures have changed. This is especially needed in scenarios like the improved 360° video coding scheme as shown in FIG. 6. However, the subpicture sub-bitstream extraction process in the latest VVC text does not have rewriting of the scaling window offset parameters.

2) In the subpicture sub-bitstream extraction process in the latest VVC text, it is required that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS, and subpicIdxTarget[ ] equal to a subpicture index present in the OLS, as inputs.

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls [targetOlsIdx][i] and with sh_subpic_id equal to the value in SubpicIdVal[subpicIdxTarget[i]] for each i in the range of 0 to NumLayersInOls[targetOlsIdx]−1, inclusive.

However, the above constraint has the following issues:
a. In the first bullet item, the input tIdTarget is missing.
b. Another issue associated with the first bullet item is as follows. Only certain combinations, not all combinations, of subpictures from the pictures of different layers can form a conforming bitstream.

3) The removal of VCL NAL units and their associated filler data NAL units and associated filler payload SEI messages, etc. is performed only when there is no external means for replacing of the parameter sets. However, such removal is also needed there is an external means for replacing of the parameter sets.

4) The current removal of filler payload SEI messages may involve rewriting of an SEI NAL unit.

5) The subpicture level information (SLI) SEI message is specified as layer-specific. However, SLI SEI message is used in the subpicture sub-bitstream extraction process as if the information applies to subpictures of all layers.

6) The scalable nesting SEI message can be used to nest SEI messages for certain extracted subpicture sequences of certain OLSs. However, the semantics of sn_num_subpics_minus1 and sn_subpic_id_len_minus1 are specified to be layer-specific due to the use of the wording "in the CLVS" or "in a CLVS".

7) A few aspects need to be changed to support the extraction of bitstreams like in the lower part of FIG. 6, wherein in the extracted bitstream sent to the decoder, pictures that contained multiple subpictures in the original bitstream now contain less subpictures, while pictures that contained only one subpicture remain unchanged.

5. EXAMPLES OF SOLUTIONS AND EMBODIMENTS

To solve the above problems, and others, methods as summarized below are disclosed. The items should be considered as examples to explain the general concepts and should not be interpreted in a narrow way. Furthermore, these items can be applied individually or combined in any manner. In the descriptions below, parts that have been added or modified from the related specification are highlighted in bold and italicized, and some of the deleted parts are marked with the double square brackets (e.g., [[a]] denotes the deletion of the character "a"). There may be some other changes that are editorial in nature and thus not highlighted.

1) To solve problem 1, calculation and rewriting of the scaling window offset parameters (such as in the PPSs) are specified as part of the subpicture sub-bitstream extraction process.
   a. In one example, the scaling window offset parameters are calculated and rewritten as follows:

---

- The variables subpicScalWinLeftOffset, subpicScalWinRightOffset, subpicScalWinTopOffset and subpicScalWinBotOffset are derived as follows:
  subpicScalWinLeftOffset = pps_scaling_win_left_offset − (C.30)
     sps_subpic_ctu_top_left_x[ spIdx ] * CtbSizeY / SubWidthC
  rightSubpicBd = ( sps_subpic_ctu_top_left_x[ spIdx ] +
     sps_subpic_width_minus1[ spIdx ] + 1 ) * CtbSizeY
  subpicScalWinRightOffset =
     ( rightSubpicBd >= sps_pic_width_max_in_luma_samples ) ?
  (C.31)
     pps_scaling_win_right_offset : pps_scaling_win_right_offset −
     ( sps_pic_width_max_in_luma_samples − rightSubpicBd ) /
  SubWidthC
  subpicScalWinTopOffset = pps_scaling_win_top_offset − (C.32)
     sps_subpic_ctu_top_left_y[ spIdx ] * CtbSizeY / SubHeightC
  botSubpicBd = ( sps_subpic_ctu_top_left_y[ spIdx ] +
     sps_subpic_height_minus1[ spIdx ] + 1 ) * CtbSizeY
  subpicScalWinBotOffset =
     ( botSubpicBd >= sps_pic_height_max_in_luma_samples ) ?
  (C.33)
     pps_scaling_win_bottom-offset: pps_scaling_win_bottom_offset
     −
     ( sps_pic_height_max_in_luma_samples − botSubpicBd ) /

---

SubHeightC

Where sps_subpic_ctu_top_left_x[spIdx], sps_subpic_width_minus1 [spIdx], sps_subpic_ctu_top_left_y[spIdx], sps_subpic_height_minus1[spIdx], sps_pic_width_max_in_luma_samples, and sps_pic_height_max_in_luma_samples in the above equations are from the original SPSs before they were rewritten, and pps_scaling_win_left_offset, pps_scaling_win_right_offset, pps_scaling_win_top_offset, and pps_scaling_win_bottom_offset in the above are from the original PPSs before they were rewritten.

Rewrite the values of pps_scaling_win_left_offset, pps_scaling_win_right_offset, pps_scaling_win_top_offset, and pps_scaling_win_bottom_offset in all the referenced PPS NAL units to be equal to subpicScalWinLeftOffset, subpicScalWinRightOffset, subpicScalWinTopOffset, and subpicScalWinBotOffset, respectively.

b. In one example, sps_pic_width_max_in_luma_samples and sps_pic_height_max_in_luma_samples in the above equations are replaced with pps_pic_width_in_luma_samples and pps_pic_height_in_luma_samples, respectively, and pps_pic_width_in_luma_samples and pps_pic_height_in_luma_samples are the values in the original PPSs before they were rewritten.

c. In one example, additionally, rewrite the reference sample enabled flag in the SPSs (e.g., sps_ref_pic_resampling_enabled_flag) when changed and the resolution change in CLVS allowed flag (e.g., sps_res_change_in_clvs_allowed_flag) in the SPSs when changed.

2) The following methods are proposed for solving the problems 2a and 2b.
   a. To solve problem 2a, add the missing input tIdTarget, e.g., by changing the following:
       The output sub-bitstream is the output of the process specified in this clause with the bitstream, targetOlsIdx equal to an index to the list of OLSs specified by the VPS, and subpicIdxTarget[ ] equal to a subpicture index present in the OLS, as inputs.
   to be the following:
       The output sub-bitstream is the output of the process specified in this clause with the bitstream, targetOlsIdx equal to an index to the list of OLSs specified by the VPS, *tIdTarget equal to any value in the range of 0 to vps_max_sublayers_minus1, inclusive,* and subpicIdxTarget[ ] equal to a subpicture index present in the OLS, as inputs.
   b. To solve problem 2b, clearly specify which combination of subpictures of different layers is required to be a conforming bitstream when extracted, e.g., as follows:
       It is a requirement of bitstream conformance for the input bitstream that any output sub-bitstream that satisfies all of the following conditions shall be a conforming bitstream:
           The output sub-bitstream is the output of the process specified in this clause with the bitstream, targetOlsIdx equal to an index to the list of OLSs specified by the VPS, tIdTarget equal to any value in the range of 0 to vps_max_sublayers_minus1, inclusive, and *the list* subpicIdxTarget[ *i* ] *for i from 0 to NumLayersInOls[ targetOLsIdx ] - 1, inclusive, satisfying the following conditions,* as inputs:
               - *All layers in the targetOLsIdx-th OLS have the same spatial resolution, the same subpicture layout, and all the subpicture have sps_subpic_treated_as_ _pic_flag[ ] equal to 1.*
               - *The values of subpicIdxTarget[ i ] . for all values of i are identical and equal to a particular value in the range of 0 to sps_num_subpics_ minus1, inclusive.*
           The output sub-bitstream contains at least one VCL NAL unit with nuh_layer_id equal to each of the nuh_layer_id values in the list LayerIdInOls [targetOlsIdx].
           The output sub-bitstream contains at least one VCL NAL unit with TemporalId equal to tIdTarget.
               NOTE—A conforming bitstream contains one or more coded slice NAL units with TemporalId equal to 0, but does not have to contain coded slice NAL units with nuh_layer_id equal to 0.
           The output sub-bitstream contains at least one VCL NAL unit with nuh_layer_id equal to LayerIdInOls[targetOlsIdx][i] and sh_subpic_id equal to SubpicIdVal[subpicIdxTarget[i]] for each i in the range of 0 to NumLayersInOls[targetOlsIdx]−1, inclusive.
3) To solve problem 3, the removal of VCL NAL units and their associated filler data NAL units and associated filler payload SEI messages, etc. is performed regardless of whether there is external means for replacing of the parameter sets.
4) To solve problem 4, add a constraint to require an SEI NAL unit containing a filler payload SEI message to not contain other types of SEI messages and specify the removal of filler payload SEI messages as removal of SEI NAL units containing filler payload SEI messages.
5) To solve problem 5, it is specified such that the values of one or more of SubpicSetLevelIdc, SubpicCpbSizeVcl[SubpicSetLevelIdx][subpicIdx], SubpicCpbSizeNal[SubpicSetLevelIdx][subpicIdx], SubpicBitrateVcl[SubpicSetLevelIdx][subpicIdx] SubpicBitrateNal[SubpicSetLevelIdx][subpicIdx], and sli_cbr_constraint_flag that are derived based on or found in the SLI SEI message are respectively the same for all the layers in the target OLS of the extraction process.
   a. In one example, it is constrained that, for use with a multi-layer OLS, an SLI SEI message shall be contained in a scalable nesting SEI message and shall be indicated in the scalable nesting SEI message to apply to specific OLSs (i.e., when sn_ols_flag is equal to 1) that include at least the multi-layer OLS.
       i. Furthermore, the value 203, the payloadType value of the SLI SEI message, is removed from the list VclAssociatedSeiList, to enable the SLI message to be contained in a scalable nesting SEI message with sn_ols_flag is equal to 1.
   b. In one example, it is constrained that, for use with a multi-layer OLS, an SLI SEI message shall be contained in a scalable nesting SEI message and shall be indicated in the scalable nesting SEI message to apply to the list of specific layers (i.e., sn_ols_flag is equal to 1) that consists of all layers of the multi-layer OLS.
   c. In one example, specify the SLI SEI message to be OLS-specific, e.g., by adding an OLS index to the SLI SEI message syntax to indicate the OLS to which the information carried in the SEI message applies.
       i. Alternatively, add a list of OLS indices into the SLI SEI message syntax to indicate a list of OLSs to which the information carried in the SEI message applies.
   d. In one example, it is required that the values of one or more of SubpicSetLevelIdc, SubpicCpbSizeVcl [SubpicSetLevelIdx][subpicIdx], SubpicCpbSizeNal [SubpicSetLevelIdx][subpicIdx], SubpicBitrateVcl [SubpicSetLevelIdx][subpicIdx] SubpicBitrateNal [SubpicSetLevelIdx][subpicIdx], and sli_cbr_constraint_flag in all SLI SEI messages for all layers of an OLS shall be respectively the same.
6) To solve problem 6, the semantics of are changed from the following: sn_num_subpics_minus1 plus 1 specifies the number of subpictures to which the scalable-nested SEI messages apply. The value of sn_num_subpics_minus1 shall be less than or equal to the value of sps_num_subpics_minus1 in the SPS referred to by the pictures in the CLVS.
   sn_subpic_id_len_minus1 plus 1 specifies the number of bits used to represent the syntax element sn_subpic_id[i]. The value of sn_subpic_id_len_minus1 shall be in the range of 0 to 15, inclusive.

It is a requirement of bitstream conformance that the value of sn_subpic_id_len_minus1 shall be the same for all scalable nesting SEI messages that are present in a CLVS.

to be the following:

sn_num_subpics_minus1 plus 1 specifies the number of subpictures *in each of the pictures in the OLSs (when sn_ols_flag is equal to 1) or the layers (when sn_ols_flag is equal to 0)* to which the scalable-nested SEI messages apply. The value of sn_num_subpics_minus1 shall be less than or equal to the value of sps_num_subpics_minus1 *in each of* the SPSs referred to by the pictures *in the OLSs (when sn_ols_flag is equal to 1) or the layers (when sn_ols_ _flag is equal to 0)* [[in the CLVS]].

sn_subpic_id_len_minus1 plus 1 specifies the number of bits used to represent the syntax element sn_subpic_id[i]. The value of sn_subpic_id_len_minus1 shall be in the range of 0 to 15, inclusive.

It is a requirement of bitstream conformance that the value of sn_subpic_id_len_minus1 shall be the same for all scalable nesting SEI messages that *apply to pictures within a CLVS* [[are present in a CLVS]].

7) To solve problem 7, the following methods are proposed:
   a. In one example, clearly specify which combination of subpictures of different layers, wherein there are at least two layers for which pictures of one layer each consists of multiple subpictures and pictures of another layer each consists of only one subpicture, is required to be a conforming bitstream when extracted, e.g., as follows:
      It is a requirement of bitstream conformance for the input bitstream that any output sub-bitstream that satisfies all of the following conditions shall be a conforming bitstream:
         The output sub-bitstream is the output of the process specified in this clause with the bitstream, targetOlsIdx equal to an index to the list of OLSs specified by the VPS, *tIdTarget equal to any value in the range of 0 to vps_max_sublayers_ the list* and *i ] for* subpicIdxTarget[ *minus1, inclusive, i from 0 to NumLayersInOls[ targetOLsIdx ] - 1, inclusive, satisfying the following conditions,* as inputs:
         – *The value of subpicIdxTarget[ i ] is equal to a value in the range of 0 to sps_num_subpics_minus1, inclusive, such that sps_subpic_treated_as_pic_flag[ subpicIdxTarget[ i ] ] is equal to 1, where sps_num_ subpics_minus1 and sps_subpic_treated_as_pic_flag[ subpicIdxTarget[ i ] ] are found in or inferred based on the SPS referred to by the layer with nuh_layer_id equal to LayerIdInOls[ targetOLsIdx ][ i ]. NOTE 1 - When the sps_num_ subpics_minus1 for the layer with nuh_layer_id equal to LayerIdInOls[ targetOLsIdx ][ i ] is equal to 0, the value of subpicIdxTarget[ i ] is always equal to 0.*
         – *For any two different integer values of m and n, the sps_num_subpics_minus1 is greater than 0 for both layers with nuh_layer_id equal to LayerIdInOls[ targetOLsIdx ][ m ] and LayerIdInOls[ targetOLsIdx ][ n ], respectively, subpicIdxTarget[ m ] is equal to subpicIdxTarget[ n ].*
      The output sub-bitstream contains at least one VCL NAL unit with nuh_layer_id equal to each of the nuh_layer_id values in the list LayerIdInOls[targetOlsIdx].
      The output sub-bitstream contains at least one VCL NAL unit with TemporalId equal to tIdTarget.
         NOTE 2—A conforming bitstream contains one or more coded slice NAL units with TemporalId equal to 0, but does not have to contain coded slice NAL units with nuh_layer_id equal to 0.
      The output sub-bitstream contains at least one VCL NAL unit with nuh_layer_id equal to LayerIdInOls[targetOlsIdx][i] and with sh_subpic_id equal to SubpicIdVal[subpicIdxTarget[i]] for each i in the range of 0 to NumLayersInOls[targetOlsIdx]−1, inclusive.
   b. The semantics of the scalable nesting SEI message are specified such that, when sn_ols_flag and sn_subpic_flag are both equal to 1, the list of sn_subpic_id[ ] values specify the subpicture IDs of the subpictures in the pictures, in the applicable OLSs, that each contains multiple subpictures. This way, it is allowed for the OLSs to which the scalable-nested SEI messages apply to have layers in which each picture contains only one subpicture, for which the subpicture ID is not indicated in the scalable nesting SEI message.
8) It is required that a first reference picture is not set as the collocated picture of a current picture, if the first picture is split into subpictures in a subpicture layout that is different from the subpicture layout of the current picture.
   a. In one example, the first reference picture and the current picture are in different layers.
9) It is required that a coding tool X is disabled for a current picture if the coding tool X relies on a first reference picture and the first reference picture is split into subpictures in a subpicture layout that is different from the subpicture layout of the current picture.
   a. In one example, the first reference picture and the current picture are in different layers.
   b. In one example, the coding tool X is bi-directional optical flow (BDOF).
   c. In one example, the coding tool X is decoder-side motion vector refinement (DMVR).
   d. In one example, the coding tool X is prediction refinement with optical flow (PROF).

6. EMBODIMENTS

Below are some example embodiments for some of the aspects summarized above in Section 5, which can be applied to the VVC specification. The changed texts are based on the latest VVC text in JVET-R2001-vA/v10. Most relevant parts that have been added or modified are high-

6.1. First Embodiment

This embodiment is for items 1, 1.a, 2a, 2b, 3, 4, 5, 5a, 5.a.i, and 6.

C.7 Subpicture Sub-Bitstream Extraction Process

Inputs to this process are a bitstream inBitstream, a target OLS index targetOlsIdx, a target highest TemporalId value tIdTarget, and [[an array]] *a list* of target subpicture index values [[for each layer]] subpicIdxTarget[ *i*] *for i from 0 to NumLayersnOls[ targetOLsIdx ] − 1, inclusive.*

Output of this process is a sub-bitstream outBitstream.

It is a requirement of bitstream conformance for the input bitstream that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS,

*tIdTarget equal to any value in the range of 0 to vps_max_sublayers_minus1, inclusive,* inclusive, and *the list* subpicIdxTarget[*i*][[equal to a subpicture index present in the OLS, as inputs.]] *for i from 0 to NumLayersInOls[ targetOLsIdx ] - 1, inclusive, satisfying the following conditions, as inputs:*

- *All layers in the targetOLsIdx-th OLS have the same spatial resolution, the same value for sps_num_subpics_minus1, and the same subpicture layout, and all the subpicture have sps_subpic_treated_as_pic_flag[ ] equal to 1.*
- *The values of subpicIdxTarget[ i ] for all values of i are identical and equal to a particular value in the range of 0 to sps_num_subpics_ minus1, inclusive.*
- *When NumLayersInOls[ targetOlsIdx ] is greater than 1 and sps_num_ 0, a subpicture level information SEI message shall be present in a scalable sn_ols_flag equal to 1 and NestingOlsIdx[ to sn_num_olss_minus1, inclusive. subpics_minus1 is greater than nesting SEI message with ] is equal to targetOlsIdx for one value of i in the range of 0* for use with a multi-layer OLS, an SLI SEI message shall be contained in a scalable nesting SEI message and shall be indicated in the scalable nesting SEI message to apply to specific OLSs or to apply to all layers in specific OLSs.

The output sub-bitstream contains at least one VCL NAL unit with nuh_layer_id equal to each of the nuh_layer_id values in *the list* LayerIdInOls[targetOlsIdx].—

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls[targetOlsIdx][i] and with sh_subpic_id equal to [[the value in]] SubpicIdVal[subpicIdxTarget[i]] for each i in the range of 0 to NumLayersInOls[targetOlsIdx]−1, inclusive.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

- *For each value of i in the range of 0 to NumLayersInOls[ targetOLsIdx ] − 1, inclusive, remove from outBitstream all VCL NAL units with nuh_layer_id equal to LayerIdInOls[ targetOLsIdx ][ i ] and sh_subpic_id not equal to SubpicIdVal[ subpicIdxTarget[ i ] ] and their associated filler data NAL units and SEI NAL units that contain filler payload SEI messages.*
- *When sli_cbr_constraint_flag is equal to 0, remove all NAL units with nal_unit_type equal to FD_NUT and SEI NAL units containing filler payload SEI messages.*

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:

[[The variable subpicIdx is set equal to the value of subpicIdxTarget[[NumLayersInOls[targetOlsIdx]−1].]]

Rewrite the value of general_level_idc in the vps_ols_ptl_idx[targetOlsIdx]-th entry in the list of profile_tier_level( ) syntax structures in all the referenced VPS NAL units to be equal to SubpicSetLevelIdc derived in Equation D.11 for the set of subpictures consisting of the subpictures with subpicture index equal to subpicIdx.

When VCL HRD parameters or NAL HRD parameters are present, rewrite the respective values of cpb_size_value_minus1[tIdTarget][j] and bit_rate_value_minus1[tIdTarget][j] of the j-th CPB in the vps_ols_hrd_idx[MultiLayerOlsIdx[targetOlsIdx]]-th ols_hrd_parameters( ) syntax structure in all the referenced VPS NAL units and in the ols_hrd_parameters( ) syntax structures in all SPS NAL units referred to by the i-th layer, such that they correspond to SubpicCpbSizeVcl[SubpicSetLevelIdx][subpicIdx], and SubpicCpbSizeNal[SubpicSetLevelIdx][subpicIdx] as derived by Equations D.6 and D.7, respectively, SubpicBitrateVcl[SubpicSetLevelIdx][subpicIdx] and SubpicBitrateNal[SubpicSetLevelIdx][subpicIdx] as derived by Equations D.8 and D.9, respectively, where SubpicSetLevelIdx is derived by Equation D.11 for the subpicture with subpicture index equal to subpicIdx, j is in the range of 0 to hrd_cpb_cnt_minus1, inclusive, and i is in the range of 0 to NumLayersInOls[targetOlsIdx]−1, inclusive.

For [[the i-th layer with]] *each value of* i in the range of 0 to NumLayersInOls[targetOlsIdx]−1, the following applies.

- *The variable spIdx is set equal to subpicIdxTarget[ i ].*

Rewrite the value of general_level_idc in the profile_tier_level( ) syntax structure in all the referenced SPS NAL units with sps_ptl_dpb_hrd_params_present_flag equal to 1 to be equal to SubpicSetLevelIdc derived by Equation D.11 for the set of subpictures consisting of the subpicture with subpicture index equal to spIdx.

The variables subpicWidthInLumaSamples and subpicHeightInLumaSamples are derived as follows:

subpicWidthInLumaSamples=min((sps_subpic_ctu_top_left_x[spIdx]+sps_subpic_width_minus1[spIdx]+1)*CtbSizeY, pps_pic_width_in_luma_samples)−sps_subpic_ctu_top_left_x[spIdx]*CtbSizeY (C.24)

subpicHeightInLumaSamples=min((sps_subpic_ctu_top_left_y[spIdx]+sps_subpic_height_minus1[spIdx]+1)*CtbSizeY, pps_pic_height_in_luma_samples)−sps_subpic_ctu_top_left_y[spIdx]*CtbSizeY (C.25)

Rewrite the values of the sps_pic_width_max_in_luma_samples and sps_pic_height_max_in_luma_samples in all the referenced SPS NAL units and the values of pps_pic_width_in_luma_samples and pps_pic_height_in_luma_samples in all the referenced PPS NAL units to be equal to subpicWidthInLumaSamples and subpicHeightInLumaSamples, respectively.

Rewrite the value of sps_num_subpics_minus1 in all the referenced SPS NAL units and pps_num_subpics_minus1 in all the referenced PPS NAL units to 0.

Rewrite the syntax elements sps_subpic_ctu_top_left_x[spIdx] and sps_subpic_ctu_top_left_y[spIdx], when present, in all the referenced SPS NAL units to 0.

Remove the syntax elements sps_subpic_ctu_top_left_x[j], sps_subpic_ctu_top_left_y[j], sps_subpic_width_minus1[j], sps_subpic_height_minus1[j], sps_subpic_treated_aspic_flag[j], sps_loop_filter_across_subpic_enabled_flag[j], and sps_subpic_id[j] in all the referenced SPS NAL units and for each j that is not equal to spIdx.

Rewrite the syntax elements in all the referenced PPS for signalling of tiles and slices to remove all tile rows, tile columns, and slices that are not associated with the subpicture with subpicture index equal to spIdx.

The variables subpicConfWinLeftOffset, subpicConfWinRightOffset, subpicConfWinTopOffset and subpicConfWinBottomOffset are derived as follows:

subpicConfWinLeftOffset=sps_subpic_ctu_top_left_x[spIdx]==0?sps_conf_win_left_offset:0 (C.26)

subpicConfWinRightOffset=(sps_subpic_ctu_top_left_x[spIdx]+sps_subpic_width_minus1[spIdx]+1)*CtbSizeY>=sps_pic_width_max_in_luma_samples?sps_conf_win_right_offset:0 (C.27)

subpicConfWinTopOffset=sps_subpic_ctu_top_left_y[spIdx]==0?sps_conf_win_top_offset:0 (C.28)

subpicConfWinBottomOffset=(sps_subpic_ctu_top_left_y[spIdx]+sps_subpic_height_minus1[spIdx]+1)*CtbSizeY>=
*sps_pic_height_max_in_luma_samples ? sps_conf_win_bottom_offset : 0* (C.29)

*Where sps_subpic_ctu_top_left_x[ spIdx ],*
*sps_subpic_width_minus1[ spIdx ],*
*sps_subpic_ctu_top_left_y[ spIdx ],*
*sps_subpic_height_minus1[ spIdx ],*
*sps_pic_width_max_in_luma_samples,*
*sps_pic_height_max_in_luma_samples,*
*sps_conf_win_left_offset,*
*sps_conf_win_right_offset,*
*sps_conf_win_top_offset, and*
*sps_conf_win_bottom_offset in the above*
*equations are from the original*
*SPSs before they were rewritten.* .

Rewrite the values of sps_conf_win_left_offset, sps_conf_win_right_offset, sps_conf_win_top_offset, and sps_conf_win_bottom_offset in all the referenced SPS NAL units and the values of pps_conf_win_left_offset, pps_conf_win_right_offset, pps_conf_win_top_offset, and pps_conf_win_bottom_offset in all the referenced PPS NAL units to be equal to subpicConfWinLeftOffset, subpicConfWinRightOffset, subpicConfWinTopOffset, and subpicConfWinBottomOffset, respectively.

- *The variables subpicScalWinLeftOffset,*
*subpicScalWinRightOffset,*
*subpicScalWinTopOffset and*
*subpicScalWinBotOffset*
*are derived as follows:*
*subpicScalWinLeftOffset = pps_*
*scaling_win_left_offset - (C.30)*
*sps_subpic_ctu_top_left_x[ spIdx ]*
*\* CtbSizeY / SubWidthC*
*rightSubpicBd = ( sps_subpic_*
*ctu_top_left_x[ spIdx ] +*
*sps_subpic_width_minus1*
*[ spIdx ] + 1 ) \* CtbSizeY*

*subpicScalWinRightOffset = ( rightSubpicBd*
*>= sps_pic_width_max in_luma_samples ) ?*
*pps_scaling_win_right_offset : pps_*
*scaling_win_right_offset - (C.31)*
*( sps_pic_width_max_in_luma_samples*
*- rightSubpicBd ) / SubWidthC*
*subpicScalWinTopOffset = pps_*
*scaling_win_top_offset - (C.32)*
*sps_subpic_ctu_top_left_y[ spIdx ]*
*\* CtbSizeY / SubHeightC*
*botSubpicBd = ( sps_subpic_*
*ctu_top_left_y[ spIdx ] +*
*sps_subpic_height_minus1*
*[ spIdx ] + 1 ) \* CtbSizeY*
*subpicScalWinBotOffset = ( botSubpicBd*
*>= sps_pic_height_max_in_luma_samples ) ?*
*(C.33)*
*pps_scaling_win_bottom_offset*
*: pps_scaling_win_bottom_offset -*
*( sps_pic_height_max_in_luma_samples*
*- botSubpicBd ) / SubHeightC*
*Where sps_subpic_ctu_top_left_x[ spIdx ],*
*sps_subpic_width_minus1[ spIdx ],*
*sps_subpic_ctu_top_left_y[ spIdx ],*
*sps_subpic_height_minus1[ spIdx ],*
*sps_pic_width_max_in_luma_samples,*
*and sps_pic_height_max_in_*
*luma samples in the above*
*equations are from the original SPSs*
*before they were rewritten, and pps_*
*scaling_win_left_offset,*
*pps_scaling_win_right_offset, pps_* scaling_win_top_offset, and pps_scaling_win_bottom_offset in the above are from the original PPSs before they were rewritten.
- Rewrite the values of pps_scaling_win_left_offset, pps_scaling_win_right_offset, pps_scaling_win_top_offset, and pps_scaling_win_bottom_offset in all the referenced PPS NAL units to be equal to subpicScalWinLeftOffset, subpicScalWinRightOffset, subpicScalWinTopOffset, and subpicScalWinBotOffset, respectively.
  [[Remove from outBitstream all VCL NAL units with nuh_layer_id equal to the nuh_layer_id of the i-th layer and with sh_subpic_id not equal to SubpicIdVal[subpicIdx].]]
  [[When]] If sli_cbr_constraint_flag is equal to 1, [[remove all NAL units with nal_unit_type equal to FD_NUT and filler payload SEI messages that are not associated with the VCL NAL units of a subpicture in subpicIdTarget[ ] and]] set cbr_flag[tIdTarget][j] equal to 1 of the j-th CPB in the vps_ols_hrd_idx[MultiLayerOlsIdx[targetOlsIdx]]-th ols_hrd_parameters( )) syntax structure in all the referenced VPS NAL units and SPS NAL units and j in the range of 0 to hrd_cpb_cnt_minus1. Otherwise, (sli_cbr_constraint_flag is equal to 0), [[remove all NAL units with nal_unit_type equal to FD_NUT and filler payload SEI messages and]] set cbr_flag[tIdTarget][j] equal to 0.
When outBitstream contains SEI NAL units that contain a scalable nesting SEI message with sn_ols_flag equal to 1 and sn_subpic_flag equal to 1 that are applicable to outBitstream, extract appropriate non-scalable-nested SEI message with payloadType equal to 1 (PT), 130 (DUI), or 132 (decoded picture hash) from the scalable nesting SEI message and place the extracted SEI messages into outBitstream.

D.2.2 General SEI Payload Semantics
. . .
The list VclAssociatedSeiList is set to consist of the payloadType values 3, 19, 45, 129, 132, 137, 144, 145, 147 to 150, inclusive, 153 to 156, inclusive, 168, [[203,]] and 204. The list PicUnitRepConSeiList is set to consist of the payloadType values 0, 1, 19, 45, 129, 132, 133, 137, 147 to 150, inclusive, 153 to 156, inclusive, 168, 203, and 204.
  NOTE 4—VclAssociatedSeiList consists of the payloadType values of the SEI messages that, when non-scalable-nested and contained in an SEI NAL unit, infer constraints on the NAL unit header of the SEI NAL unit on the basis of the NAL unit header of the associated VCL NAL unit. PicUnitRepConSeiList consists of the payloadType values of the SEI messages that are subject to the restriction on 4 repetitions per PU.
It is a requirement of bitstream conformance that the following restrictions apply on containing of SEI messages in SEI NAL units:
  When an SEI NAL unit contains a non-scalable-nested BP SEI message, a non-scalable-nested PT SEI message, or a non-scalable-nested DUI SEI message, the SEI NAL unit shall not contain any other SEI message with payloadType not equal to 0 (BP), 1 (PT), or 130 (DUI).
  When an SEI NAL unit contains a scalable-nested BP SEI message, a scalable-nested PT SEI message, or a scalable-nested DUI SEI message, the SEI NAL unit shall not contain any other SEI message with payloadType not equal to 0 (BP), 1 (PT), 130 (DUI) or 133 (scalable nesting).
  - When an SEI NAL unit contains a filler payload SEI message, the SEI NAL unit shall not contain any other SEI message that are not filler payload SEI messages.
. . .
D.6.2 Scalable Nesting SEI Message Semantics
. . .
sn_num_subpics_minus1 plus 1 specifies the number of subpictures *in each of the pictures in the OLSs (when sn_ols_flag is equal to 1) or the layers (when sn_ols_flag is equal to 0)* to which the scalable-nested SEI messages apply. The value of sn_num_subpics_minus1 shall be less than or equal to the value of sps_num_subpics_minus1 *in each of* the SPSs referred to by the pictures *in the OLSs (when sn_ols_flag is equal to 1) or the layers (when sn_ols_flag is equal to 0)* [[in the CLVS]].
sn_subpic_id_len_minus1 plus 1 specifies the number of bits used to represent the syntax element sn_subpic_id[i]. The value of sn_subpic_id_len_minus1 shall be in the range of 0 to 15, inclusive.
It is a requirement of bitstream conformance that the value of sn_subpic_id_len_minus1 shall be the same for all scalable nesting SEI messages that *apply to pictures within a CLVS* [[are present in a CLVS]].
. . .

Figure 7:
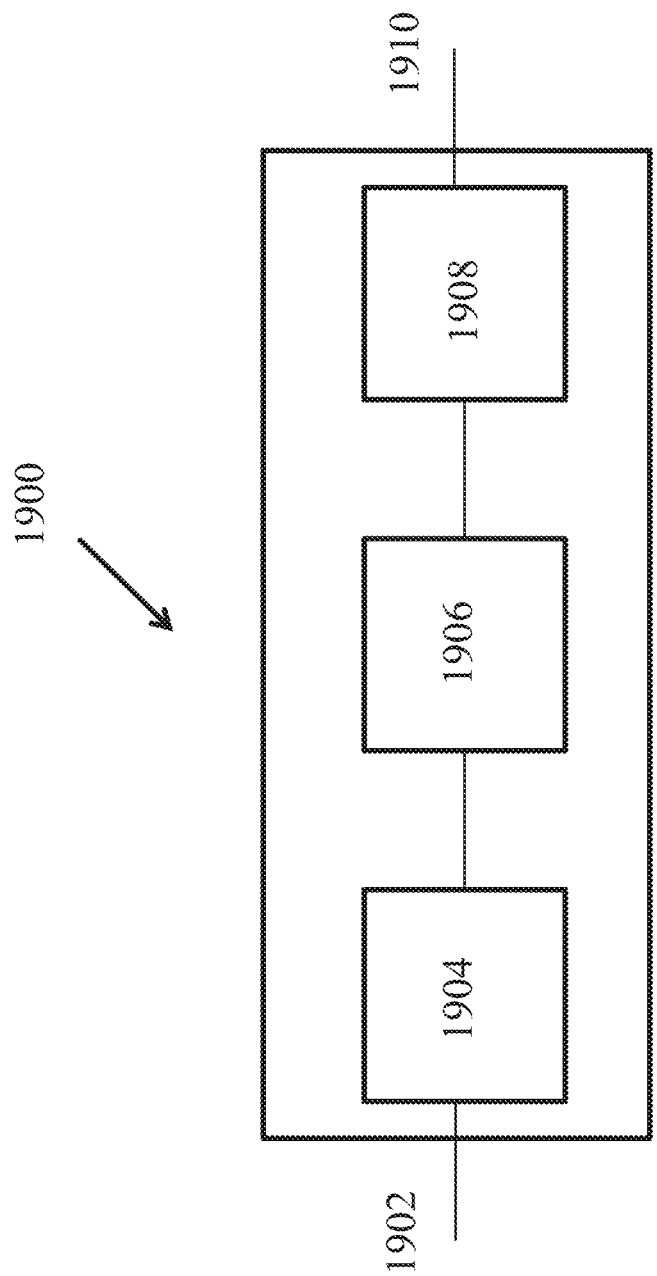
FIG. 7 is a block diagram of an example video processing system.

FIG. 7 is a block diagram showing an example video processing system 1900 in which various embodiments disclosed herein may be implemented. Various embodiments may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 8:
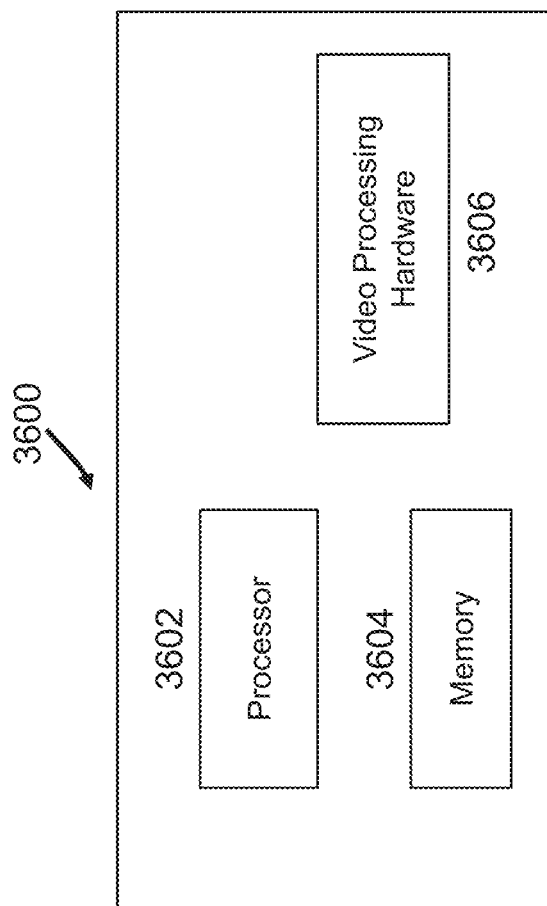
FIG. 8 is a block diagram of a video processing apparatus.

FIG. 8 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 10:
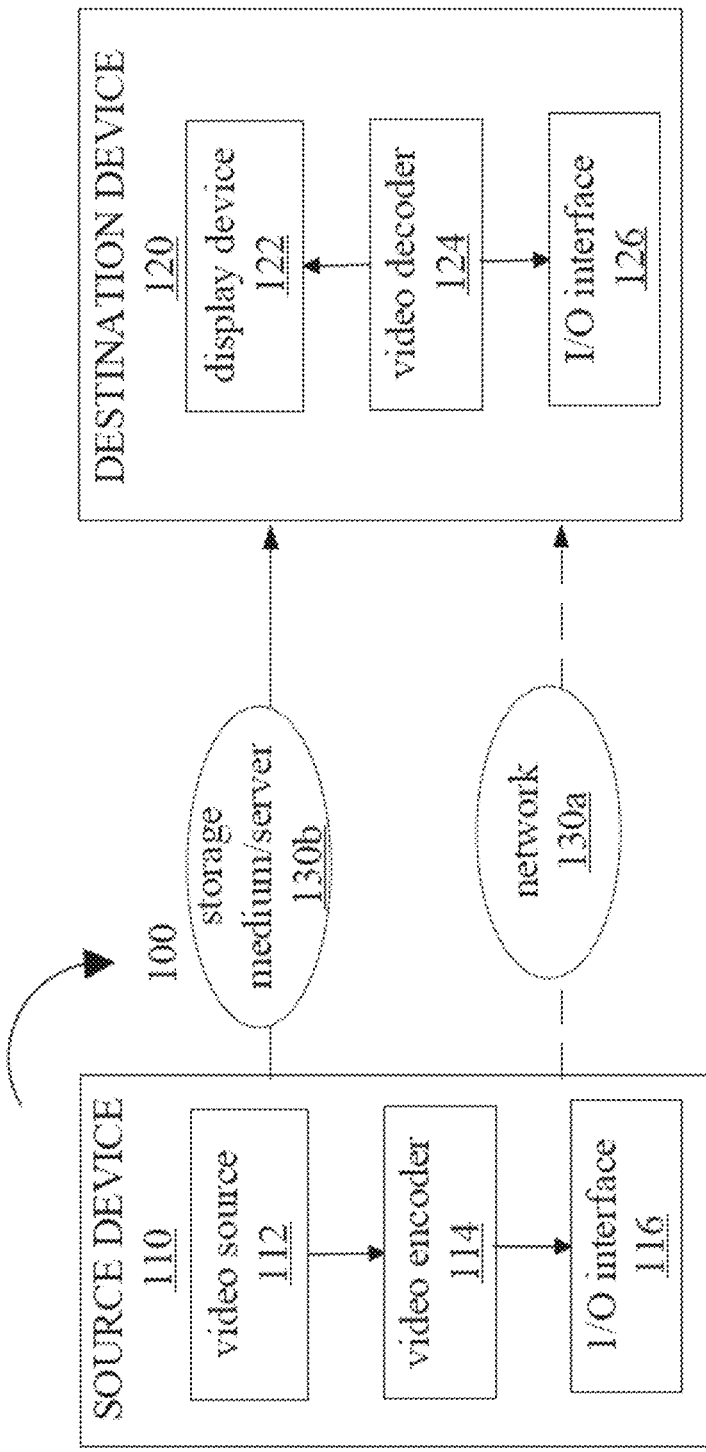
FIG. 10 is a block diagram that illustrates a video coding system in accordance with some embodiments of the present disclosure.

FIG. 10 is a block diagram that illustrates an example video coding system 100 that may utilize the embodiments of this disclosure.

As shown in FIG. 10, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 11:
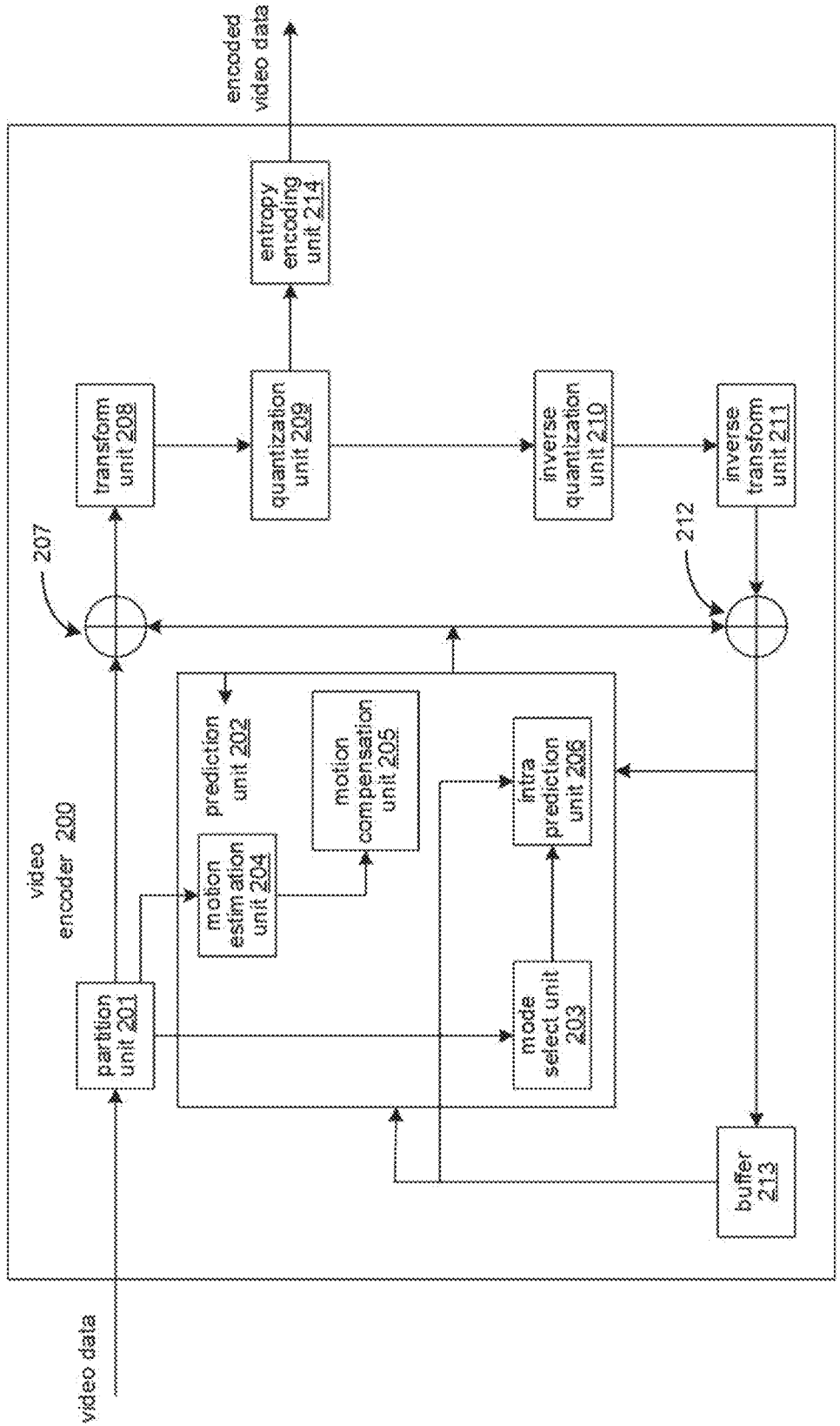
FIG. 11 is a block diagram that illustrates an encoder in accordance with some embodiments of the present disclosure.

FIG. 11 is a block diagram illustrating an example of video encoder 200, which may be video encoder 114 in the system 100 illustrated in FIG. 10.

Video encoder 200 may be configured to perform any or all of the embodiments of this disclosure. In the example of FIG. 11, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 11 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 12:
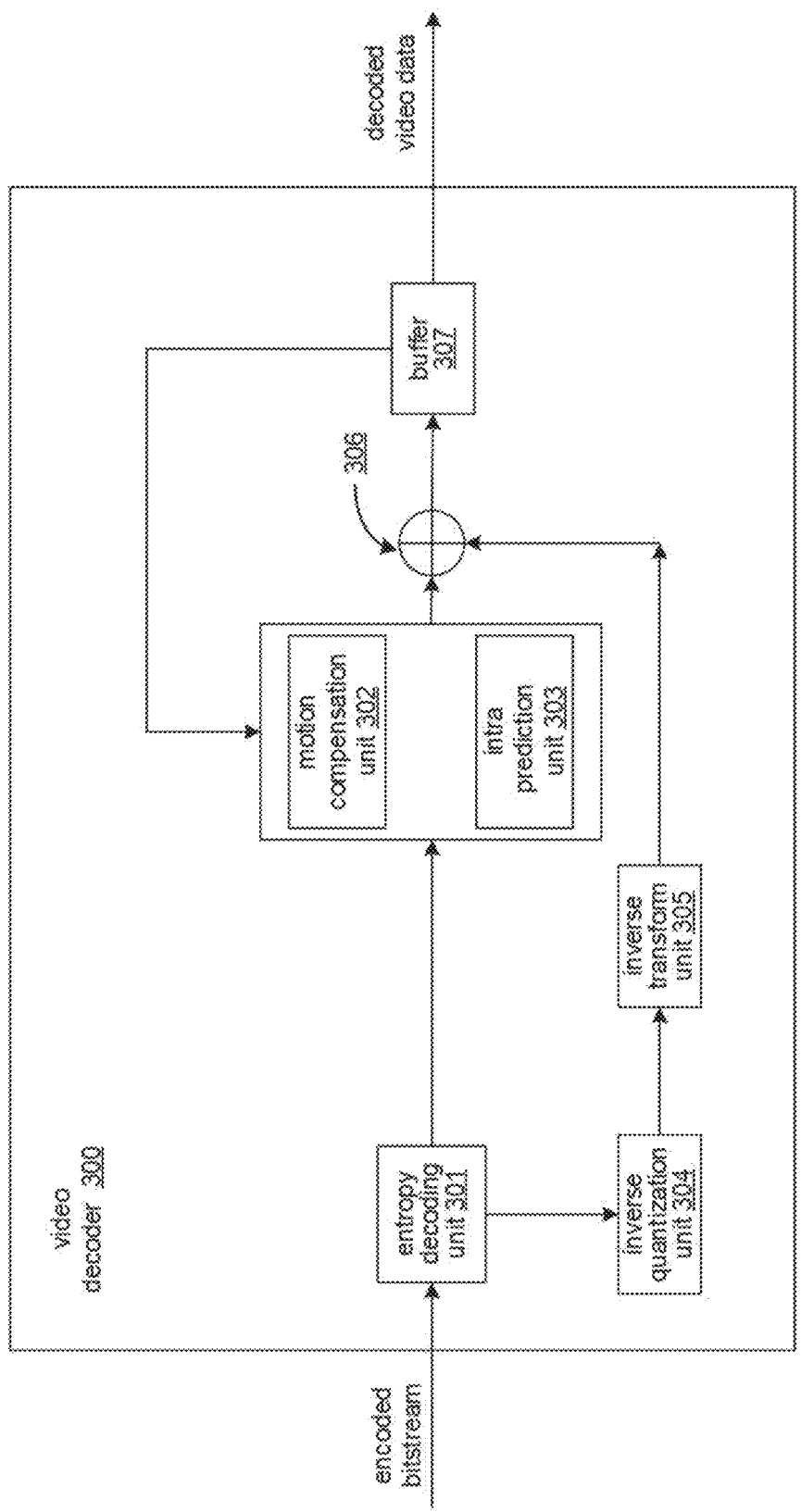
FIG. 12 is a block diagram that illustrates a decoder in accordance with some embodiments of the present disclosure.

FIG. 12 is a block diagram illustrating an example of video decoder 300 which may be video decoder 124 in the system 100 illustrated in FIG. 10.

The video decoder 300 may be configured to perform any or all of the embodiments of this disclosure. In the example of FIG. 12, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 12, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 11).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions describes some embodiments of the present disclosure.

A first set of solutions is provided next. The following solutions show example embodiments discussed in the previous section (e.g., item 1).

Figure 9:
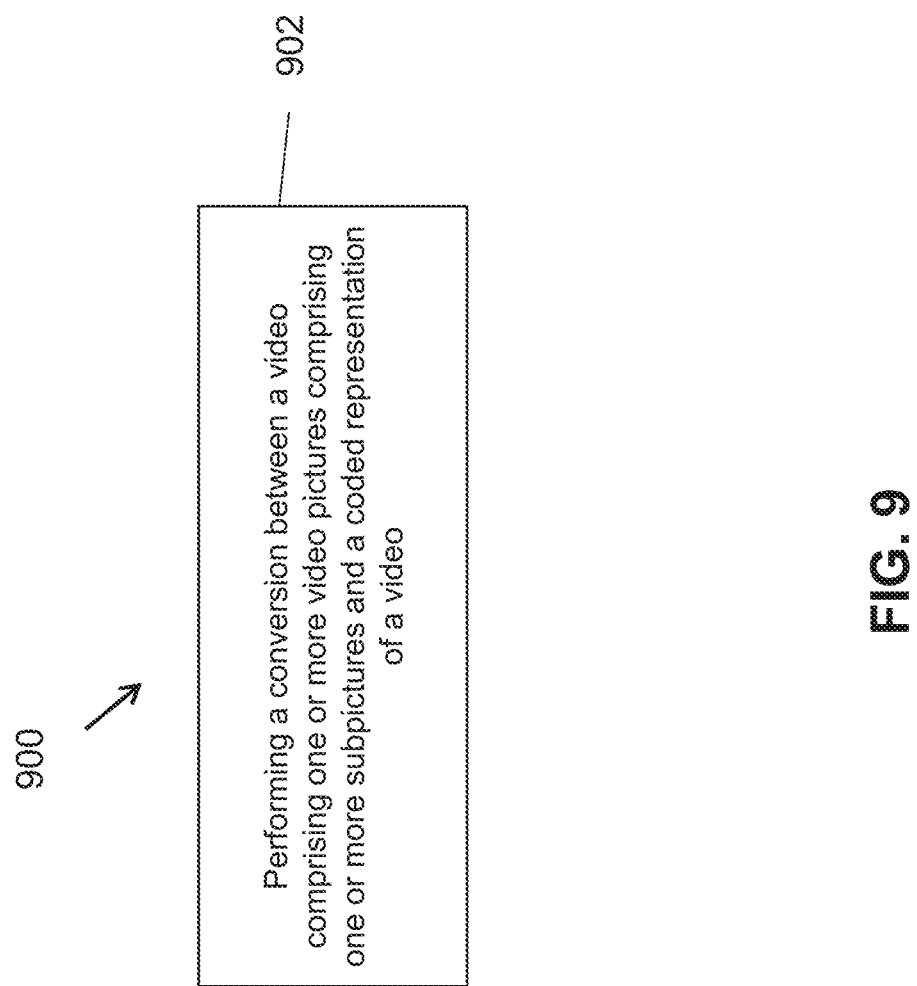
FIG. 9 is a flowchart for an example method of video processing.

1. A video processing method (e.g., method 900 depicted in FIG. 9), comprising: performing (902) a conversion between a video comprising one or more video pictures comprising one or more subpictures and a coded representation of a video, wherein the coded representation conforms to a format rule, wherein the format rule specifies that one or more parameters for a scaling window applicable to a subpicture are determined based on one or more syntax fields included in the coded representation.

2. The method of solution 1, wherein the one or more parameters include a left offset, a right offset, a top offset, or a bottom offset of the scaling window applicable to the subpicture.

The following solutions show example embodiments discussed in the previous section (e.g., item 3).

3. A video processing method, comprising: performing a conversion between a video comprising one or more video pictures in a video coding layer and a coded representation of a video, wherein the conversion conforms to a rule that specifies to perform removal of a network abstraction layer unit and a filter data and filler supplemental enhancement information data regardless of whether a parameter set is replaceable externally.

The following solutions show example embodiments discussed in the previous section (e.g., item 4).

4. A video processing method, comprising: performing a conversion between a video comprising one or more video pictures in a video coding layer and a coded representation of a video, wherein the conversion conforms to a format rule that specifies to exclude other supplemental enhancement information (SEI) from a network abstraction layer that includes a filler SEI message payload.

5. The method of solution 1, wherein the conversion conforms to a rule that specifies to remove filler payload SEI messages as SEI NAL units.

The following solutions show example embodiments discussed in the previous section (e.g., item 7).

6. A video processing method, comprising: performing a conversion between a video comprising one or more layers comprising one or more video pictures comprising one or more subpictures and a coded representation of a video, wherein the conversion is according a rule that specifies which combination of subpictures of different layers, wherein there are at least two layers such that pictures of one layer each consists of multiple subpictures and pictures of another layer each consists of only one subpicture, are required to conform to a format rule.

The following solutions show example embodiments discussed in the previous section (e.g., item 8).

7. A video processing method, comprising: performing a conversion between a video comprising one or more layers comprising one or more video pictures comprising one or more subpictures and a coded representation of a video, wherein the conversion conforms to a rule that specifies that, for a first picture split into subpictures using a subpicture layout, a second picture cannot be used as a collocated reference picture in case that the second picture is split according a different subpicture layout than the first picture.

8. The method of solution 7, wherein the first picture and the second picture are in different layers.

The following solutions show example embodiments discussed in the previous section (e.g., item 9).

9. A video processing method, comprising: performing a conversion between a video comprising one or more layers comprising one or more video pictures comprising one or more subpictures and a coded representation of a video, wherein the conversion conforms to a rule that specifies that, for a first picture split into subpictures using a subpicture layout, use of a coding tool during encoding, or a corresponding decoding tool during decoding, is disabled in case that the coding tool relies on a different subpicture layout for a second picture that is a reference picture of the first picture.

10. The method of solution 9, wherein the first picture and the second picture are in different layers.

11. The method of any of solutions 1 to 10, wherein the conversion comprises encoding the video into the coded representation.

12. The method of any of solutions 1 to 10, wherein the conversion comprises decoding the coded representation to generate pixel values of the video.

13. A video decoding apparatus comprising a processor configured to implement a method recited in one or more of solutions 1 to 12.

14. A video encoding apparatus comprising a processor configured to implement a method recited in one or more of solutions 1 to 12.

15. A computer program product having computer code stored thereon, the code, when executed by a processor, causes the processor to implement a method recited in any of solutions 1 to 12.

16. A method, apparatus or system described in the present disclosure.

A second set of solutions show example embodiments discussed in the previous section (e.g., item 1).

Figure 13:
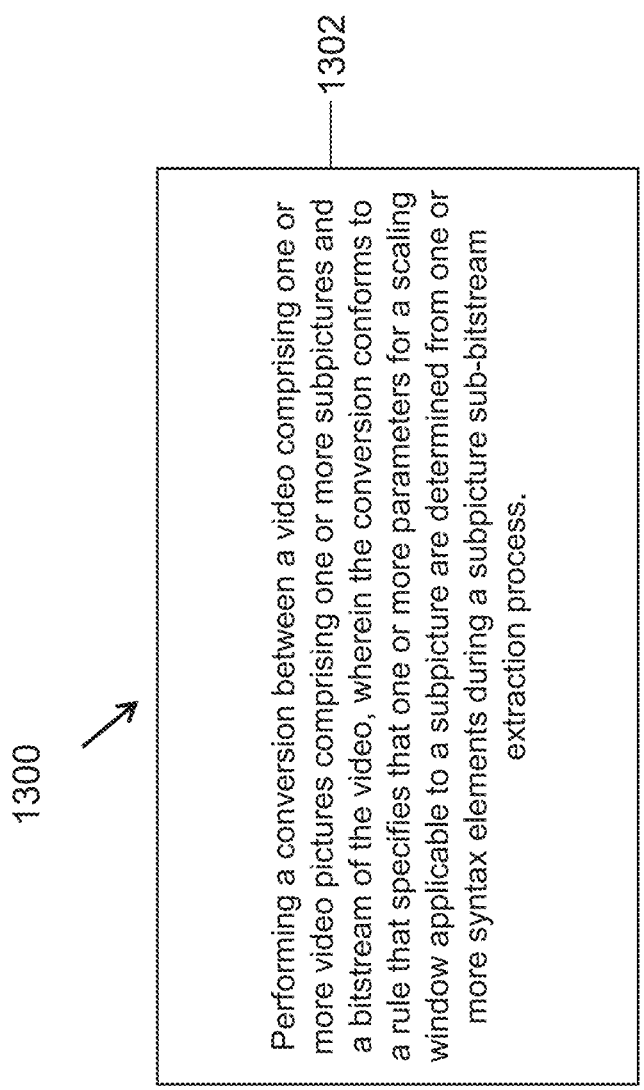
FIG. 13 shows a flowchart for an example method of video processing based on some embodiments of the present disclosure.

1. A method of video processing (e.g., method 1300 as shown in FIG. 13), comprising: performing 1302 a conversion between a video comprising one or more video pictures comprising one or more subpictures and a bitstream of the video, wherein the conversion conforms to a rule that specifies that one or more parameters for a scaling window applicable to a subpicture are determined from one or more syntax elements during a subpicture sub-bitstream extraction process.

2. The method of solution 1, wherein the one or more syntax elements are included in an original picture parameter set and/or an original sequence parameter set.

3. The method of solution 1 or 2, wherein the original picture parameter set and/or the original sequence parameter set is changed with a calculation and a rewriting of the one or more parameters.

4. The method of any of solutions 1 to 3, wherein the one or more parameters include at least one of a left offset, a right offset, a top offset, or a bottom offset of the scaling window applicable to the subpicture.

5. The method of any of solutions 1 to 4, wherein the left offset of the scaling window (subpicScalWinLeftOffset) is derived as follows:
subpicScalWinLeftOffset=pps_scaling_win_left_offset−sps_subpic_ctu_top_left_x[spIdx]*CtbSizeY/SubWidthC, and wherein pps_scaling_win_left_offset indicates left offsets applied to a picture size for scaling ratio calculation, sps_subpic_ctu_top_left_x[spIdx] indicates a x-coordinate of a coding tree unit located at a top-left corner of the subpicture, CtbSizeY is a width or a height of a luma coding tree block or coding tree unit, and SubWidthC indicates a width of a video block and is obtained from a table according to a chroma format of a picture including the video block.

6. The method of any of solutions 1 to 4, wherein the right offset of the scaling window, subpicScalWinRightOffset, is derived as follows:

subpicScalWinRightOffset=
(rightSubpicBd>=sps_pic_width_max_in_luma_samples)?pps_scaling_win_right_offset:pps_s-caling_win_right_offset−(sps_pic_width_max_in_luma_samples−rightSubpicBd)/
SubWidthC, and wherein sps_pic_width_max_in_luma_samples specifies a maximum width, in units of luma samples, of each decoded picture referring to a sequence parameter set, pps_scaling_win_right_offset indicates right offsets applied to a picture size for scaling ratio calculation, SubWidthC indicates a width of a video block and is obtained from a table according to a chroma format of a picture including the video block, and rightSubpicBd=(sps_subpic_ctu_top_left_x[spIdx]+sps_subpic_width_minus1 [spIdx]+1)*CtbSizeY, and wherein sps_subpic_ctu_top_left_x [spIdx] indicates a x-coordinate of a coding tree unit located at a top-left corner of the subpicture, sps_subpic_width_minus1 [spIdx] indicates a width of the subpicture, and CtbSizeY is a width or a height of a luma coding tree block or coding tree unit.

7. The method of any of solutions 1 to 4, wherein the top offset of the scaling window, subpicScalWinTopOffset, is derived as follows:

subpicScalWinTopOffset=pps_scaling_win_top_offset−sps_subpic_ctu_top_left_y[spIdx]*CtbSizeY/
SubHeightC, wherein pps_scaling_win_top_offset indicates top offsets applied to a picture size for scaling ratio calculation, sps_subpic_ctu_top_left_y[spIdx] indicates a y-coordinate of a coding tree unit located at a top-left corner of the subpicture, CtbSizeY is a width or a height of a luma coding tree block or coding tree unit, and SubHightC indicates a height of a video block and is obtained from a table according to a chroma format of a picture including the video block.

8. The method of any of solutions 1 to 4, wherein the bottom offset of the scaling window, ubpicScalWinBotOffset, is derived as follows:

subpicScalWinBotOffset=
(botSubpicBd>=sps_pic_height_max_in_luma_samples)?pps_scaling_win_bottom_offset:pps_s-caling_win_bottom_offset−(sps_pic_height_max_in_luma_samples−botSubpicBd)/
SubHeightC, and wherein spspic_height_max_in_luma_samples indicates a maximum height, in units of luma samples, of each decoded picture referring to a sequence parameter set, pps_scaling_win_bottom_offset indicates bottom offsets applied to a picture size for scaling ratio calculation, SubHeightC indicates a height of a video block and is obtained from a table according to a chroma format of a picture including the video block, and wherein botSubpicBd=(sps_subpic_ctu_top_left_y
[spIdx]+sps_subpic_height_minus1[spIdx]+1)
*CtbSizeY, and wherein sps_subpic_ctu_top_left_y[spIdx] indicates a y-coordinate of a coding tree unit located at a top-left corner of the subpicture, and CtbSizeY is a width or a height of a luma coding tree block or coding tree unit.

9. The method of any of solutions 5-8, wherein sps_subpic_ctu_top_left_x[spIdx], sps_subpic_width_minus1 [spIdx], sps_subpic_ctu_top_left_y[spIdx], sps_subpic_height_minus1 [spIdx], sps_pic_width_max_in_luma_samples, and spspic_height_max_in_luma_samples are from the original sequence parameter set, and pps_scaling_win_left_offset, pps_scaling_win_right_offset, pps_scaling_win_top_offset, and pps_scaling_win_bottom_offset are from the original picture parameter set.

10. The method of any of solutions 1 to 3, wherein the rule specifies to rewrite values of pps_scaling_win_left_offset, pps_scaling_win_right_offset, pps_scaling_win_top_offset, and pps_scaling_win_bottom_offset in all referenced picture parameter set (PPS) network abstraction layer (NAL) units to be equal to subpicScalWinLeftOffset, subpicScalWinRightOffset, subpicScalWinTopOffset, and subpicScalWinBotOffset, respectively, and wherein pps_scaling_win_left_offset, pps_scaling_win_right_offset, pps_scaling_win_top_offset, and pps_scaling_win_bottom_offset respectively indicate left offsets, right offsets, top offsets, bottom offsets that are applied to a picture size for scaling ratio calculation, and wherein subpicScalWinLeftOffset, subpicScalWinRightOffset, subpicScalWinTopOffset, and subpicScalWinBotOffset respectively indicate a left offset, a right offset, a top offset, and a bottom offset of the scaling window applicable to the subpicture.

11. The method of any of solutions 1 to 4, wherein the bottom offset of the scaling window, ubpicScalWinBotOffset, is derived as follows:

subpicScalWinBotOffset=
(botSubpicBd>=pps_pic_height_in_luma_samples)?pps_scaling_win_bottom_offset:pps_scaling_win_bottom_offset−(pps_pic_height_in_luma_samples−botSubpicBd)/SubHeightC, and wherein pps_pic_height_max_in_luma_samples indicates a maximum height, in units of luma samples, of each decoded picture referring to a picture parameter set, pps_scaling_win_bottom_offset indicates bottom offsets applied to a picture size for scaling ratio calculation, SubHeightC indicates a height of a video block and is obtained from a table according to a chroma format of a picture including the video block, and wherein botSubpicBd=(sps_subpic_ctu_top_left_y[spIdx]+sps_subpic_height_minus1[spIdx]+1)*CtbSizeY, wherein sps_subpic_ctu_top_left_y[spIdx] indicates a y-coordinate of a coding tree unit located at a top-left corner of the subpicture, and CtbSizeY is a width or a height of a luma coding tree block or coding tree unit.

12. The method of solution 11, wherein pps_pic_height_in_luma_samples is from the original picture parameter set.

13. The method of solution 1, wherein the rule further specifies to rewrite a reference sample enabled flag in a sequence parameter set that indicates an applicability of a reference picture resampling.

14. The method of solution 1, wherein the rule further specifies to rewrite a resolution change allowed flag in a sequence parameter set that indicates a possible picture spatial resolution change within a coded layer video sequence (CLVS) referring to the sequence parameter set.

15. The method of any of solutions 1 to 14, wherein the conversion includes encoding the video into the bitstream.

16. The method of any of solutions 1 to 14, wherein the conversion includes decoding the video from the bitstream.

17. The method of any of solutions 1 to 14, wherein the conversion includes generating the bitstream from the video, and the method further comprises: storing the bitstream in a non-transitory computer-readable recording medium.

18. A video processing apparatus comprising a processor configured to implement a method recited in any one or more of solutions 1 to 17.

19. A method of storing a bitstream of a video, comprising, a method recited in any one of solutions 1 to 17, and further including storing the bitstream to a non-transitory computer-readable recording medium.

20. A computer readable medium storing program code that, when executed, causes a processor to implement a method recited in any one or more of solutions 1 to 17.

21. A computer readable medium that stores a bitstream generated according to any of the above described methods.

22. A video processing apparatus for storing a bitstream representation, wherein the video processing apparatus is configured to implement a method recited in any one or more of solutions 1 to 17.

A third set of solutions show example embodiments discussed in the previous section (e.g., items 2 and 7).

Figure 14A:
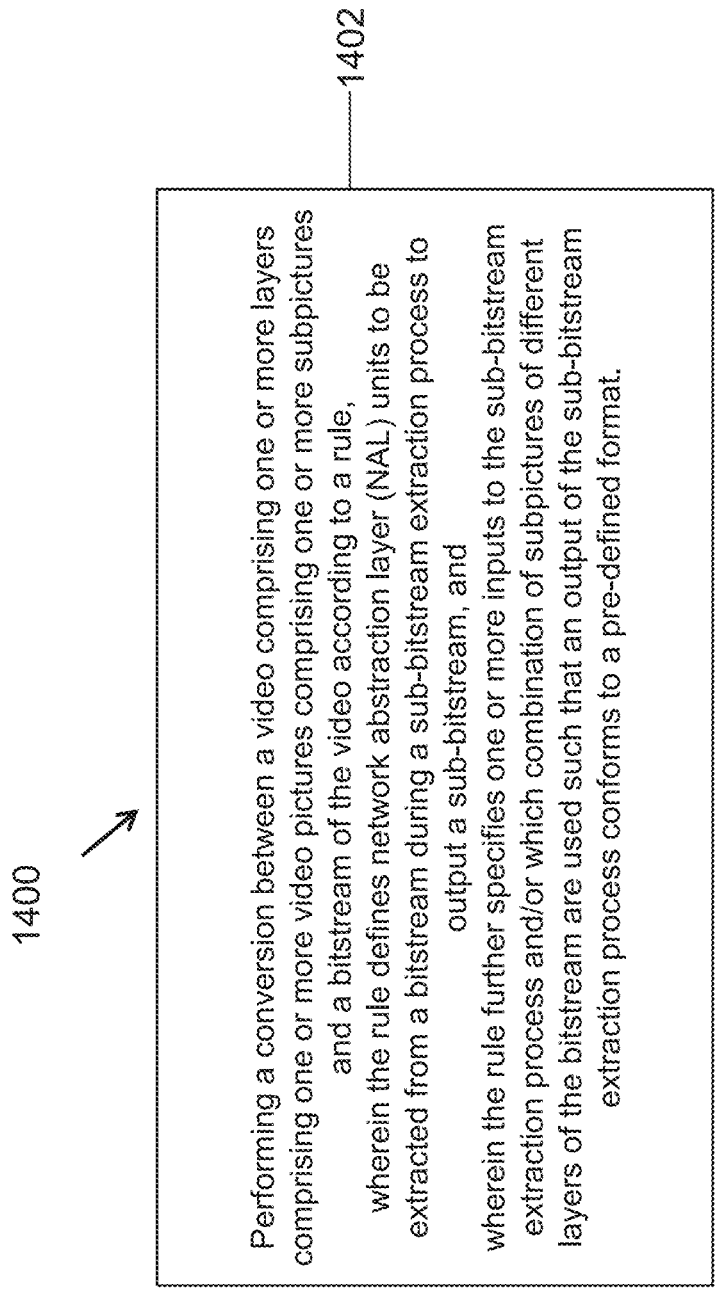

1. A method of video processing (e.g., method 1400 as shown in FIG. 14A), comprising: performing 1402 a conversion between a video comprising one or more layers comprising one or more video pictures comprising one or more subpictures and a bitstream of the video according to a rule, wherein the rule defines network abstraction layer (NAL) units to be extracted from a bitstream during a sub-bitstream extraction process to output a sub-bitstream, and wherein the rule further specifies one or more inputs to the sub-bitstream extraction process and/or which combination of subpictures of different layers of the bitstream are used such that an output of the sub-bitstream extraction process conforms to a pre-defined format.

2. The method of solution 1, wherein the rule specifies that the one or more inputs to the sub-bitstream extraction process includes a target output layer set (OLS) index (targetOlsIdx) that identifies an OLS index of a target OLS to be decoded and is equal to an index to a list of OLSs specified by a video parameter set.

3. The method of solution 1, wherein the rule specifies that the one or more inputs to the sub-bitstream extraction process include a target highest temporal identifier value (tIdTarget).

4. The method of solution 3, wherein the target highest temporal identifier value is in a range of 0 to a maximum number of temporal sublayers that are allowed to be present in a layer specified by a video parameter set.

5. The method of solution 4, wherein the maximum number of the temporal sublayers is indicated by a syntax element included in a video parameter set.

6. The method of solution 5, wherein the syntax element is vps_max_sublayers_minus1.

7. The method of solution 1, wherein the rule specifies that the one or more inputs to the sub-bitstream extraction process include a target subpicture index value (subpicIdxtarget) that is equal to a subpicture index present in a target OLS.

8. The method of solution 1, wherein the rule specifies that the one or more inputs to the sub-bitstream extraction process include a list of target subpicture index values, subpicIdxTarget[i] for i from 0 to NumLayersInOls[targetOLsIdx]−1, whereby NumLayerInOls[i] specifies a number of layers in an i-th OLS and targetOLsIdx indicates a target output layer set (OLS) index.

9. The method of solution 8, wherein the rule specifies all layers in a targetOLsIdx-th OLS have a same spatial resolution, a same subpicture layout, and all subpictures have a syntax element specifying that a corresponding subpicture of each coded picture in a coded layer video sequence is treated as a picture in a decoding process excluding in-loop filtering operations.

10. The method of solution 8, wherein values of subpicIdxTarget[i] for all values of i are identical and equal to a particular value in a range of 0 to sps_num_subpics_minus1, whereby sps_num_subpics_minus1 plus 1 specifies a number of subpictures in each picture in a coded layer video sequence.

11. The method of solution 8, wherein the rule specifies that the output sub-bitstream contains at least one video coding layer (VCL) network abstraction layer (NAL) unit with nuh_layer_id equal to each of nuh_layer_id values in a list of LayerIdInOls[targetOlsIdx], whereby nuh_layer_id is a NAL unit header identifier and LayerIdInOls[targetOlsIdx] specifies the nuh_layer_id value in an OLS with the targetOLsIdx.

12. The method of solution 8, wherein the rule specifies that the output sub-bitstream contains at least one video coding layer (VCL) network abstraction layer (NAL) unit with TemporalId equal to tIdTarget, whereby TemporalId indicates a target highest temporal identifier and tIdTarget is a value of TemporalId that is provided as one or more inputs to the sub-bitstream extraction process.

13. The method of solution 8, wherein the bitstream contains one or more coded slice network abstraction layer (NAL) units with TemporalId equal to 0 without needing to contain coded slice NAL units with nuh_layer_id equal to 0, whereby nuh_layer_id specifies a NAL unit header identifier.

14. The method of solution 8, wherein the rule specifies that the output sub-bitstream contains at least one video coding layer (VCL) network abstraction layer (NAL) unit with a NAL unit header identifier, nuh_layer_id, equal to a layer identifier, LayerIdInOls[targetOlsIdx][i] and with a subpicture identifier, sh_subpic_id, equal to SubpicIdVal [subpicIdxTarget[i]] for each i in a range of 0 to NumLayersInOls[targetOlsIdx]−1, whereby where NumLayerinOls[i] specifies a number of layers in an i-th OLS and i is an integer.

15. A method of video processing (e.g., method 1410 as shown in FIG. 14B), comprising: performing 1412 a conversion between a video and a bitstream of the video according to a rule, wherein the bitstream includes a first layer including pictures comprising multiple subpictures and a second layer including pictures each comprising a single subpicture, and wherein the rule specifies a combination of subpictures of the first layer and the second layer that results, upon extraction, in an output bitstream that conforms to a pre-defined format.

16. The method of solution 15, wherein the rule is applied to a sub-bitstream extraction to provide an output sub-bitstream that is a conforming bitstream, and wherein inputs to the sub-bitstream extraction process include i) the bitstream, ii) a target output layer set (OLS) index (targetOlsIdx) identifying an OLS index of a target OLS to be decoded, and iii) a target highest temporal identifier (TemporalId) value (tIdTarget).

17. The method of solution 16, wherein the rule specifies that the target output layer set (OLS) index (targetOlsIdx) is equal to an index to a list of OLSs specified by a video parameter set.

18. The method of solution 16, wherein the rule specifies that the target highest temporal identifier (TemporalId) value (tIdTarget) is equal to any value in a range of 0 to a maximum number of temporal sublayers that are allowed to be present in a layer specified by a video parameter set.

19. The method of solution 18, wherein the maximum number of the temporal sublayers is indicated by a syntax element included in a video parameter set.

20. The method of solution 19, wherein the syntax element is vps_max_sublayers_minus1.

21. The method of solution 17, wherein the rule specifies that a value of the list of OLSs, subpicIdxTarget[i] for i from 0 to NumLayersInOls[targetOLsIdx]−1, is equal to a value in a range of 0 to a number of subpictures in each picture in a layer, where NumLayerInOls[i] specifies a number of layers in an i-th OLS, and the number of subpictures is indicated by a syntax element included in a sequence parameter set referred to by the layer that is associated with a NAL (network abstraction layer) unit header identifier (nuh_layer_id) equal to LayerIdInOls[targetOLsIdx][i] specifying the nuh_layerid values in an i-th OLS with the targetOLsIdx, and i being an integer.

22. The method of solution 21, wherein another syntax element, sps_subpic_treated_as_pic_flag[subpicIdxTarget [i]], is equal to 1 that specifies that an i-th subpicture of each coded picture in the layer is treated as a picture in a decoding process excluding in-loop filtering operations.

23. The method of solution 21, wherein the rule specifies that in case that the syntax element indicating the number of subpictures in each picture in the layer is equal to 0, the value of subpicIdxTarget[i] is always equal to 0.

24. The method of solution 21, wherein the rule specifies that, for any two different integer values of m and n, the syntax element is greater than 0 for both layers with nuh_layer_id equal to LayerIdInOls[targetOLsIdx][m] and LayerIdInOls[targetOLsIdx][n], respectively, and subpicIdxTarget[m] is equal to subpicIdxTarget[n].

25. The method of solution 16, wherein the rule specifies that the output sub-bitstream contains at least one video coding layer (VCL) network abstraction layer (NAL) unit with nuh_layer_id equal to each of nuh_layer_id values in the list LayerIdInOls[targetOlsIdx], whereby nuh_layer_id is a NAL unit header identifier and LayerIdInOls[targetOlsIdx] specifies the nuh_layer_id value in an OLS with the targetOLsIdx.

26. The method of solution 16, wherein the output sub-bitstream contains at least one video coding layer (VCL) network abstraction layer (NAL) unit with TemporalId equal to tIdTarget.

27. The method of solution 16, wherein the conforming bitstream contains one or more coded slice network abstraction layer (NAL) units with TemporalId equal to 0 without needing to contain coded slice NAL units with nuh_layer_id equal to 0, whereby nuh_layer_id specifies a NAL unit header identifier.

28. The method of solution 16, wherein the output sub-bitstream contains at least one video coding layer (VCL) network abstraction layer (NAL) unit with a NAL unit header identifier, nuh_layer_id, equal to a layer identifier, LayerIdInOls[targetOlsIdx][i] and with a subpicture identifier, sh_subpic_id, equal to SubpicIdVal[subpicIdxTarget[i]] for each i in a range of 0 to NumLayersInOls[targetOlsIdx]−1, whereby where NumLayerInOls[i] specifies a number of layers in an i-th OLS and i is an integer.

29. A method of video processing (e.g., method 1420 as shown in FIG. 14C), comprising: performing 1422 a conversion between a video and a bitstream of the video, and wherein a rule specifies whether or how an output layer set (OLS) having one or more layers that include multiple subpictures and/or one or more layers having a single subpicture is indicated by a list of subpicture identifiers in a scalable nesting supplemental enhancement information (SEI) message.

30. The method of solution 29, wherein the rule specifies, in case that sn_ols_flag and sn_subpic_flag are both equal to 1, the list of subpicture identifiers specifies subpicture identifiers of subpictures in pictures each containing multiple subpictures, whereby sn_ols_flag equal to 1 specifies that the scalable nesting SEI message applies to specific OLSs and sn_subpic_flag equal to 1 specifies that the scalable-nested SEI message that applies to specified OLSs or layers applies only to specific subpictures of the specified OLSs or the layers.

31. The method of any of solutions 1 to 30, wherein the conversion includes encoding the video into the bitstream.

32. The method of any of solutions 1 to 30, wherein the conversion includes decoding the video from the bitstream.

33. The method of any of solutions 1 to 30, wherein the conversion includes generating the bitstream from the video, and the method further comprises: storing the bitstream in a non-transitory computer-readable recording medium.

34. A video processing apparatus comprising a processor configured to implement a method recited in any one or more of solutions 1 to 33.

35. A method of storing a bitstream of a video, comprising, a method recited in any one of solutions 1 to 33, and further including storing the bitstream to a non-transitory computer-readable recording medium.

36. A computer readable medium storing program code that, when executed, causes a processor to implement a method recited in any one or more of solutions 1 to 33.

37. A computer readable medium that stores a bitstream generated according to any of the above described methods.

38. A video processing apparatus for storing a bitstream representation, wherein the video processing apparatus is configured to implement a method recited in any one or more of solutions 1 to 33.

A fourth set of solutions show example embodiments discussed in the previous section (e.g., items 3, 8 and 9).

Figure 15A:
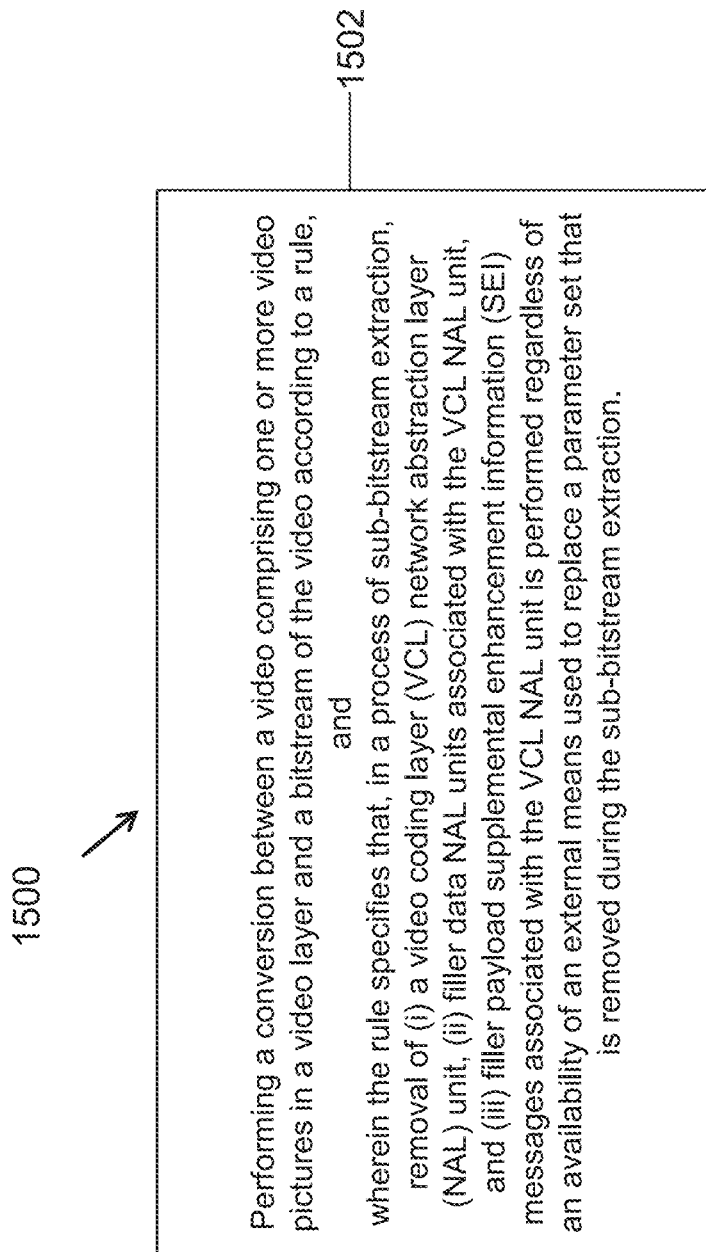

1. A method of video processing (e.g., method 1500 as shown in FIG. 15A), comprising: performing 1502 a conversion between a video comprising one or more video pictures in a video layer and a bitstream of the video according to a rule, and wherein the rule specifies that, in a process of sub-bitstream extraction, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the sub-bitstream extraction.

2. The method of solution 1, wherein the rule specifies, for each value of i in a range of 0 to NumLayersInOls[targetOlsIdx]−1, to remove, from a sub-bitstream that is an output of the sub-bitstream extraction process, all VCL NAL units with nuh_layer_id equal to LayerIdInOls[targetOlsIdx][i] and sh_subpic_id not equal to SubpicIdVal[subpicIdxTarget[i]], their associated filler data NAL units, and their associated SEI NAL units that contain filler payload SEI messages, whereby nuh_layer_id is a NAL unit header identifier, LayerIdInOls[targetOlsIdx] specifies a nuh_layer_id value in an output layer set (OLS) with the targetOLsIdx that is a target output layer set index, sh_subpic_id specifies a subpicture identifier of a subpicture that contains a slice, subpicIdxTarget[i] indicates target subpicture index values for i, and SubpicIdVal[subpicIdxTarget[i]] is a variable for subpicIdxTarget[i], i being an integer.

3. A method of video processing (e.g., method 1510 as shown in FIG. 15B), comprising: performing 1512 a conversion between a video comprising one or more layers comprising one or more video pictures comprising one or more subpictures and a bitstream of the video according to a rule, and wherein the rule specifies to disallow use of a reference picture as a collocated picture of a current picture that is split into subpictures using a subpicture layout in case that the reference picture is split according to a different subpicture layout from the subpicture layout.

4. The method of solution 3, wherein the current picture and the reference picture are in different layers.

5. A method of video processing (e.g., method 1520 as shown in FIG. 15C), comprising: performing 1522 a conversion between a video comprising one or more layers comprising one or more video pictures comprising one or more subpictures and a bitstream of the video according to a rule, wherein the rule specifies that a coding tool is disabled during the conversion of a current picture that is split into subpictures using a subpicture layout in case that the coding tool relies on a different subpicture layout from the subpicture layout for a reference picture of the current picture.

6. The method of solution 5, wherein the current picture and the reference picture are in different layers.

7. The method of solution 5, wherein the coding tool is a bi-directional optical flow (BDOF) in which one or more initial predictions are refined using an optical flow calculation.

8. The method of solution 5, wherein the coding tool is a decoder-side motion vector refinement (DMVR) in which motion information is refined by using prediction blocks.

9. The method of solution 5, wherein the coding tool is a prediction refinement with optical flow (PROF) in which one or more initial predictions are refined based on an optical flow calculation.

10. The method of any of solutions 1 to 9, wherein the conversion includes encoding the video into the bitstream.

11. The method of any of solutions 1 to 9, wherein the conversion includes decoding the video from the bitstream.

12. The method of any of solutions 1 to 9, wherein the conversion includes generating the bitstream from the video, and the method further comprises: storing the bitstream in a non-transitory computer-readable recording medium.

13. A video processing apparatus comprising a processor configured to implement a method recited in any one or more of solutions 1 to 12.

14. A method of storing a bitstream of a video, comprising, a method recited in any one of solutions 1 to 12, and further including storing the bitstream to a non-transitory computer-readable recording medium.

15. A computer readable medium storing program code that, when executed, causes a processor to implement a method recited in any one or more of solutions 1 to 12.

16. A computer readable medium that stores a bitstream generated according to any of the above described methods.

17. A video processing apparatus for storing a bitstream representation, wherein the video processing apparatus is configured to implement a method recited in any one or more of solutions 1 to 12.

A fifth set of solutions show example embodiments discussed in the previous section (e.g., item 4).

Figure 16:
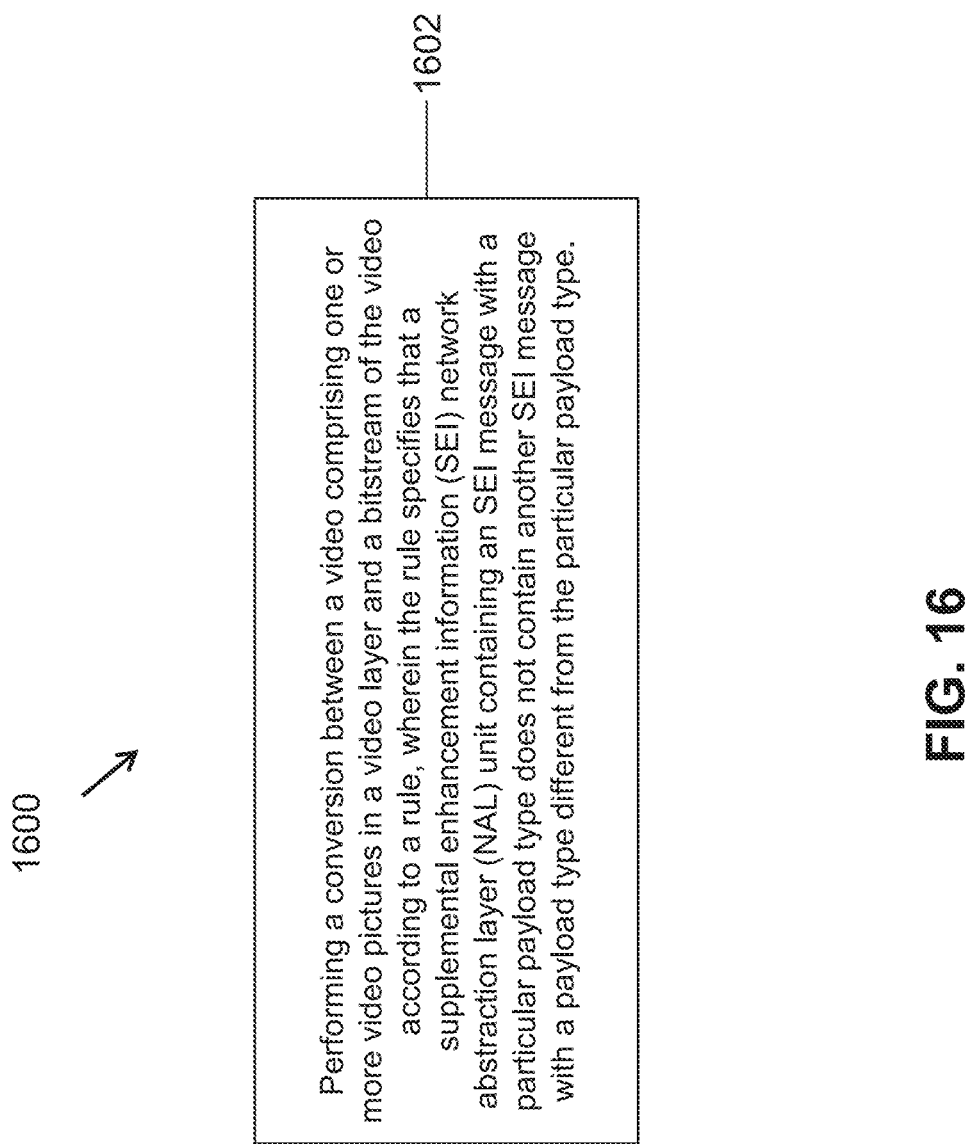
FIG. 16 shows a flowchart for an example method of video processing based on some embodiments of the present disclosure.

1. A method of video processing (e.g., method 1600 as shown in FIG. 16), comprising: performing a conversion between a video comprising one or more video pictures in a video layer and a bitstream of the video according to a rule, wherein the rule specifies that a supplemental enhancement information (SEI) network abstraction layer (NAL) unit containing an SEI message with a particular payload type does not contain another SEI message with a payload type different from the particular payload type.

2. The method of solution 1, wherein the rule specifies a removal of the SEI message as a removal of the SEI NAL unit containing the SEI message.

3. The method of solution 1 or 2, wherein the SEI message with the particular payload type corresponds to a filler payload SEI message.

4. The method of any of solutions 1 to 3, wherein the conversion includes encoding the video into the bitstream.

5. The method of any of solutions 1 to 3, wherein the conversion includes decoding the video from the bitstream.

6. The method of any of solutions 1 to 3, wherein the conversion includes generating the bitstream from the video, and the method further comprises: storing the bitstream in a non-transitory computer-readable recording medium.

7. A video processing apparatus comprising a processor configured to implement a method recited in any one or more of solutions 1 to 6.

8. A method of storing a bitstream of a video, comprising, a method recited in any one of solutions 1 to 6, and further including storing the bitstream to a non-transitory computer-readable recording medium.

9. A computer readable medium storing program code that, when executed, causes a processor to implement a method recited in any one or more of solutions 1 to 6.

10. A computer readable medium that stores a bitstream generated according to any of the above described methods.

11. A video processing apparatus for storing a bitstream representation, wherein the video processing apparatus is configured to implement a method recited in any one or more of solutions 1 to 6.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few embodiments and examples are described and other embodiments, enhancements and variations can be made based on what is described and illustrated in the present disclosure.

What is claimed is:
1. A method of processing video data, comprising:
performing a conversion between a video comprising one or more video pictures in a video layer and a bitstream of the video according to a rule,
wherein the rule specifies that, in a process of subpicture sub-bitstream extraction to output a sub-bitstream, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the subpicture sub-bitstream extraction.

2. The method of claim 1, wherein the rule specifies that, in the process of subpicture sub-bitstream extraction, for each value of i in a range of 0 to NumLayersInOls[targetOlsIdx]−1, to remove, from the output sub-bitstream, all VCL NAL units with nuh_layer_id equal to LayerIdInOls[targetOlsIdx][i] and sh_subpic_id not equal to SubpicIdVal[subpicIdxTarget[i]], their associated filler data NAL units, and their associated SEI NAL units that contain filler payload SEI messages, wherein nuh_layer_id is a NAL unit header identifier, LayerIdInOls[targetOlsIdx] specifies a nuh_layer_id value in an output layer set (OLS) with the targetOLsIdx that is a target output layer set index, sh_subpic_id specifies a subpicture identifier of a subpicture that contains a slice, subpicIdxTarget[i] indicates target subpicture index values for i, and SubpicIdVal[subpicIdxTarget[i]] is a variable for subpicIdxTarget[i], i being an integer.

3. The method of claim 1, wherein the rule further specifies that an SEI NAL unit containing an SEI message with a particular payload type does not contain another SEI message with a payload type different from the particular payload type.

4. The method of claim 3, wherein the SEI message with the particular payload type corresponds to a filler payload SEI message.

5. The method of claim 1, wherein the rule further specifies that, in a case that sli_cbr_constraint_flag is equal to 1, set cbr_flag[tIdTarget][j] of the j-th CPB in a particular output layer set (OLS) and hypothetical reference decoder (HRD) parameters syntax structure in all the referenced VPSs to be equal to 1, where j is in the range of 0 to hrd_cpb_cnt_minus1.

6. The method of claim 5, wherein the particular OLS and HRD parameters syntax structure has an index of idx[MultiLayerOlsIdx[targetOlsIdx]] to a list of OLS and HRD parameters syntax structures in a video parameter set (VPS) and applies to the targetOlsIdx-th OLS.

7. The method of claim 5, wherein cbr_flag[i][j] equal to 0 specifies that to decode this bitstream by the HRD using the j-th CPB specification, a hypothetical stream scheduler (HSS) operates in an intermittent bit rate mode, and cbr_flag[i][j] equal to 1 specifies that the HSS operates in a constant bit rate (CBR) mode.

8. The method of claim 5, wherein the rule further specifies that, in the case that sli_cbr_constraint_flag is equal to 1, the output sub-bitstream is extracted without removing all NAL units with nal_unit_type equal to FD_NUT and filler payload SEI messages that are not associated with the VCL NAL units of a subpicture in subpicIdTarget[ ].

9. The method of claim 5, wherein the rule further specifies that, in a case that sli_cbr_constraint_flag is equal to 0, set cbr_flag[tIdTarget][j] to be equal to 0, where j is in the range of 0 to hrd_cpb_cnt_minus1.

10. The method of claim 9, wherein the rule further specifies that, in the case that sli_cbr_constraint_flag is equal to 0, the output sub-bitstream is extracted without removing all NAL units with nal_unit_type equal to FD_NUT and filler payload SEI messages.

11. The method of claim 1, wherein the conversion includes encoding the video into the bitstream.

12. The method of claim 1, wherein the conversion includes decoding the video from the bitstream.

13. An apparatus for processing video data comprising a processor and a non-transitory memory with instructions thereon, wherein the instructions upon execution by the processor, cause the processor to:
perform a conversion between a video comprising one or more video pictures in a video layer and a bitstream of the video according to a rule,
wherein the rule specifies that, in a process of subpicture sub-bitstream extraction to output a sub-bitstream, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the subpicture sub-bitstream extraction.

14. The apparatus of claim 13, wherein the rule specifies that, in the process of subpicture sub-bitstream extraction, for each value of i in a range of 0 to NumLayersInOls[targetOlsIdx]−1, to remove, from the output sub-bitstream, all VCL NAL units with nuh_layer_id equal to LayerIdInOls[targetOlsIdx][i] and sh_subpic_id not equal to SubpicIdVal[subpicIdxTarget[i]], their associated filler data NAL units, and their associated SEI NAL units that contain filler payload SEI messages,
- wherein nuh_layer_id is a NAL unit header identifier, LayerIdInOls[targetOlsIdx] specifies a nuh_layer_id value in an output layer set (OLS) with the targetOLsIdx that is a target output layer set index, sh_subpic_id specifies a subpicture identifier of a subpicture that contains a slice, subpicIdxTarget[i] indicates target subpicture index values for i, and SubpicIdVal[subpicIdxTarget[i]] is a variable for subpicIdxTarget[i], i being an integer.

15. The apparatus of claim 13, wherein the rule further specifies that an SEI NAL unit containing an SEI message with a particular payload type does not contain another SEI message with a payload type different from the particular payload type.

16. The apparatus of claim 15, wherein the SEI message with the particular payload type corresponds to a filler payload SEI message.

17. The apparatus of claim 13, wherein the rule further specifies that, in a case that sli_cbr_constraint_flag is equal to 1, set cbr_flag[tIdTarget][j] of the j-th CPB in a particular output layer set (OLS) and hypothetical reference decoder (HRD) parameters syntax structure in all the referenced VPSs to be equal to 1, where j is in the range of 0 to hrd_cpb_cnt_minus1.

18. The apparatus of claim 17, wherein the particular OLS and HRD parameters syntax structure has an index of idx[MultiLayerOlsIdx[targetOlsIdx]] to a list of OLS and HRD parameters syntax structures in a video parameter set (VPS) and applies to the targetOlsIdx-th OLS.

19. The apparatus of claim 17, wherein cbr_flag[i][j] equal to 0 specifies that to decode this bitstream by the HRD using the j-th CPB specification, a hypothetical stream scheduler (HSS) operates in an intermittent bit rate mode, and cbr_flag[i][j] equal to 1 specifies that the HSS operates in a constant bit rate (CBR) mode.

20. A non-transitory computer-readable storage medium storing instructions that cause a processor to:
- perform a conversion between a video comprising one or more video pictures in a video layer and a bitstream of the video according to a rule,
- wherein the rule specifies that, in a process of subpicture sub-bitstream extraction to output a sub-bitstream, removal of (i) a video coding layer (VCL) network abstraction layer (NAL) unit, (ii) filler data NAL units associated with the VCL NAL unit, and (iii) filler payload supplemental enhancement information (SEI) messages associated with the VCL NAL unit is performed regardless of an availability of an external means used to replace a parameter set that is removed during the subpicture sub-bitstream extraction.

\* \* \* \* \*